United States Patent
Brennan et al.

(10) Patent No.: US 6,519,472 B1
(45) Date of Patent: Feb. 11, 2003

(54) TRUNKED RADIO MONITORING SYSTEM

(76) Inventors: Terence Brennan, P.O. Box 60506, Florence, MA (US) 01062; Terence Sean Sullivan, Box 425475, Melrose, MA (US) 02142

( * ) Notice: Subject to any disclaimer, the term of this patent is extended or adjusted under 35 U.S.C. 154(b) by 0 days.

(21) Appl. No.: 09/399,146

(22) Filed: Sep. 20, 1999

Related U.S. Application Data

(63) Continuation-in-part of application No. 08/820,338, filed on Mar. 12, 1997, now Pat. No. 5,956,648.

(51) Int. Cl.[7] .............................. H04B 7/00; H04Q 7/20
(52) U.S. Cl. ...................... 455/518; 455/520; 455/521
(58) Field of Search ................................ 455/518, 519, 455/520, 521, 525, 526, 515, 434, 514; 370/330; 714/756, 748

(56) References Cited

U.S. PATENT DOCUMENTS

| | | | |
|---|---|---|---|
| 4,649,567 A | | 3/1987 | Childress ...................... 455/17 |
| 4,701,944 A | * | 10/1987 | Howard et al. ............. 455/518 |
| 4,716,407 A | * | 12/1987 | Borras et al. ................ 340/2.4 |
| 4,821,292 A | * | 4/1989 | Childress .................... 375/319 |
| 4,831,373 A | * | 5/1989 | Hess .......................... 370/341 |
| 4,876,738 A | * | 10/1989 | Selby ........................ 455/435 |
| 4,905,302 A | | 2/1990 | Childress et al. ............. 455/34 |
| 4,926,496 A | * | 5/1990 | Cole et al. ..................... 455/77 |
| 4,974,223 A | * | 11/1990 | Ancheta et al. ............. 370/514 |
| 5,125,102 A | | 6/1992 | Childress et al. ............... 455/9 |
| 5,179,721 A | | 1/1993 | Comroe et al. ............. 455/33.1 |
| 5,212,724 A | | 5/1993 | Nazarenko et al. ........... 379/58 |
| 5,214,790 A | * | 5/1993 | Kozlowski et al. .......... 455/518 |
| 5,235,598 A | | 8/1993 | Sasuta ...................... 370/110.1 |
| 5,404,573 A | | 4/1995 | Yabe et al. ................. 455/33.1 |
| 5,408,680 A | | 4/1995 | Hattey et al. ................. 455/15 |
| 5,442,809 A | | 8/1995 | Diaz et al. ................. 455/54.1 |
| 5,471,646 A | | 11/1995 | Schultz ....................... 455/54.1 |
| 5,483,670 A | | 1/1996 | Childress et al. .......... 455/34.1 |
| 5,526,376 A | | 6/1996 | Keltenberger et al. ...... 375/211 |
| 5,613,209 A | | 3/1997 | Peterson et al. ........... 455/34.1 |
| 5,650,995 A | | 7/1997 | Kent .......................... 455/508 |
| 5,784,388 A | | 7/1998 | Knox .......................... 714/756 |
| 5,956,648 A | * | 9/1999 | Brennan et al. ............. 455/518 |

* cited by examiner

*Primary Examiner*—Nay Maung
*Assistant Examiner*—Raymond Persino
(74) *Attorney, Agent, or Firm*—Leydig, Voit & Mayer, Ltd.

(57) ABSTRACT

A method and apparatus for passively monitoring communications in a trunked communication system. Digital messages transmitted over a control channel at a particular frequency are monitored with a receiver. Transmitted communication signals are demodulated and stored. The stored signals are tested to identify messages and to extract talk group and channel assignment codes. If the talk group is a talk group of interest, the receiver is tuned to the frequency corresponding to the channel assignment code so that voice communications are monitored. The receiver is tuned to the control channel after each voice communication so that a communication including multiple transmissions on different frequencies is coherently monitored by retuning the receiver in accordance with the received channel assignment codes. In an alternative embodiment, separate receivers are provided for the control channel and for voice communications. The voice receiver is continually tuned to different working channels in response to talk group and channel assignment codes extracted from stored information received by the control channel receiver.

41 Claims, 17 Drawing Sheets

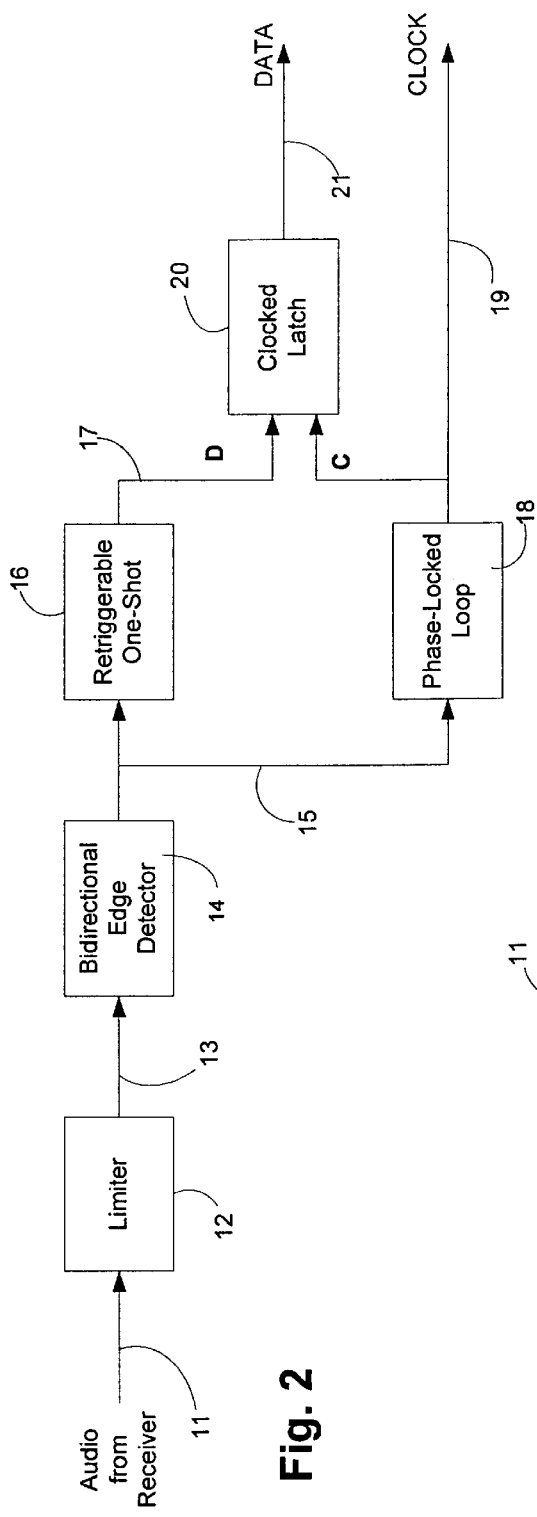
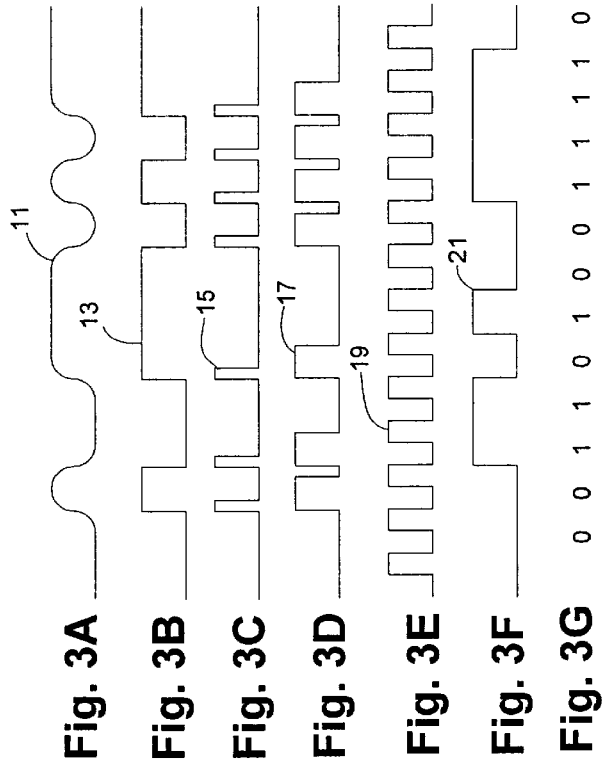
Fig. 2
Fig. 3A
Fig. 3B
Fig. 3C
Fig. 3D
Fig. 3E
Fig. 3F
Fig. 3G

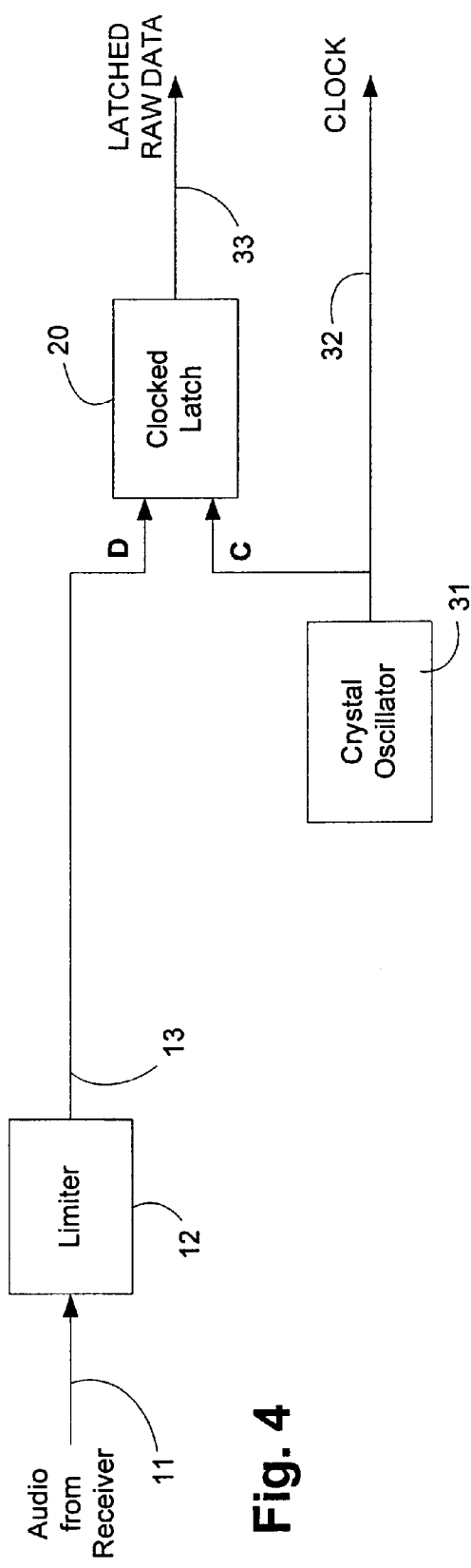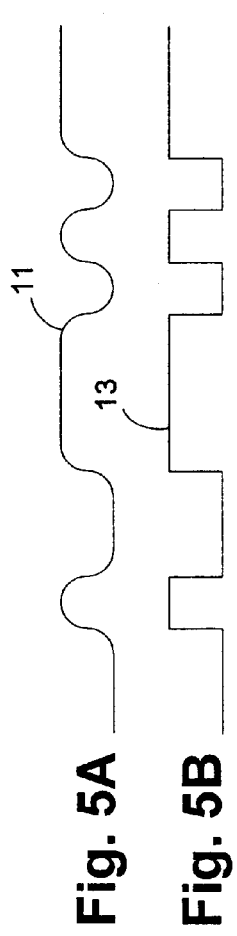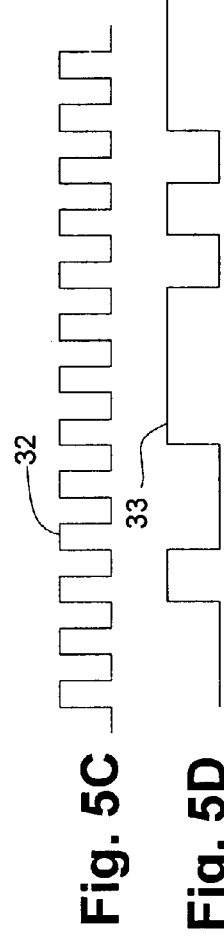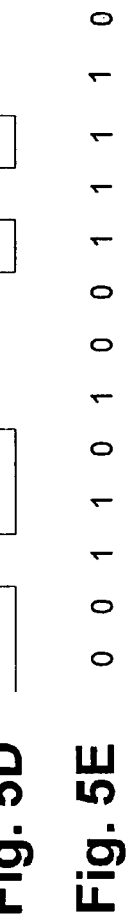
Fig. 4
Fig. 5A
Fig. 5B
Fig. 5C
Fig. 5D
Fig. 5E (Part One)

(Part Two)

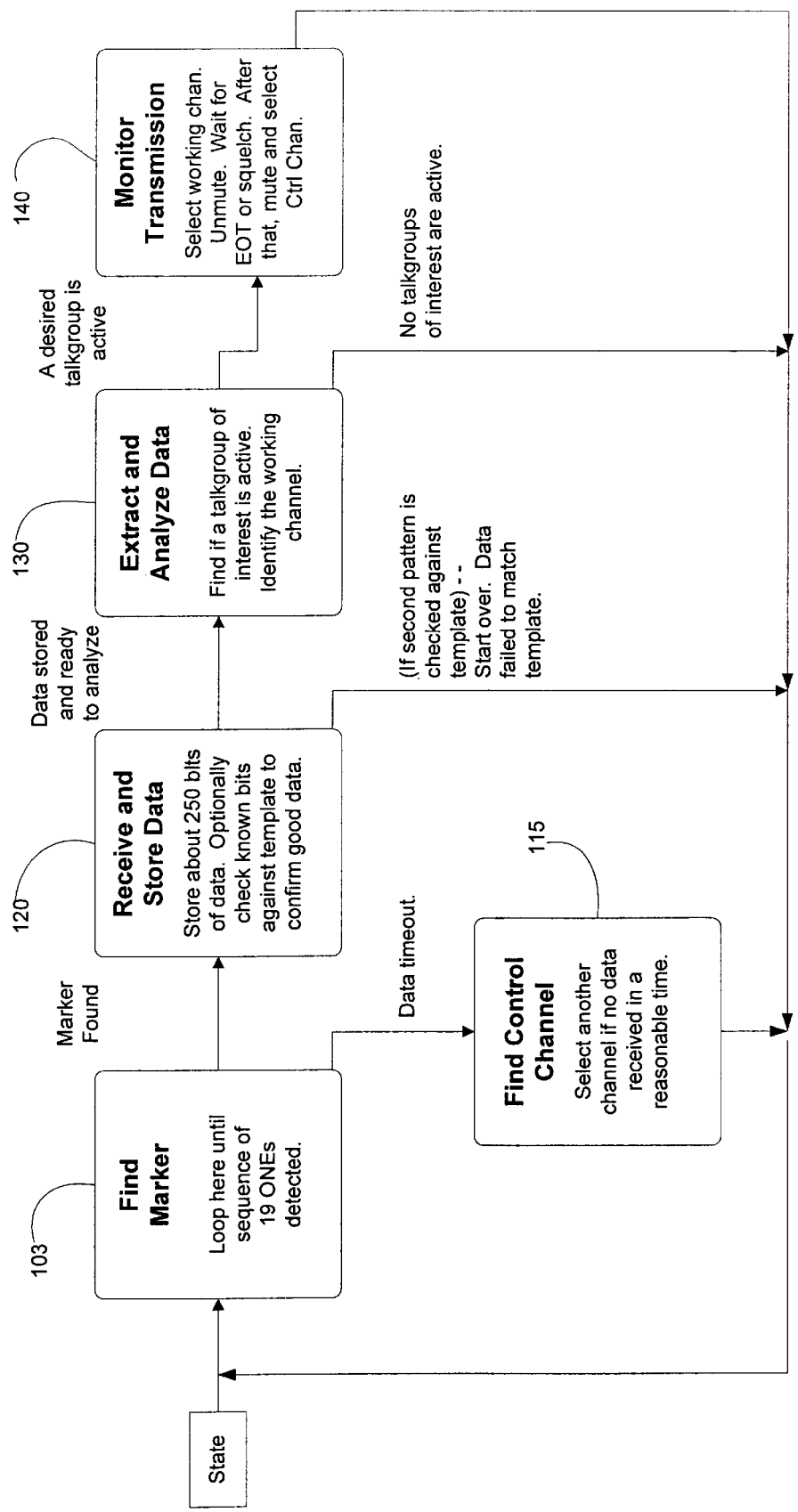

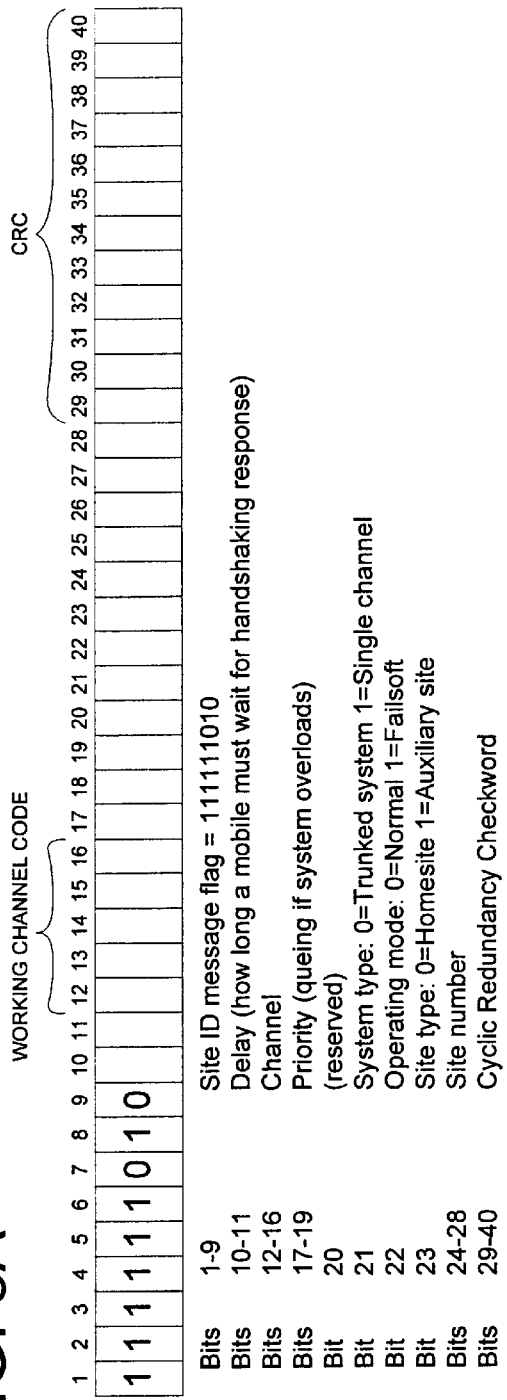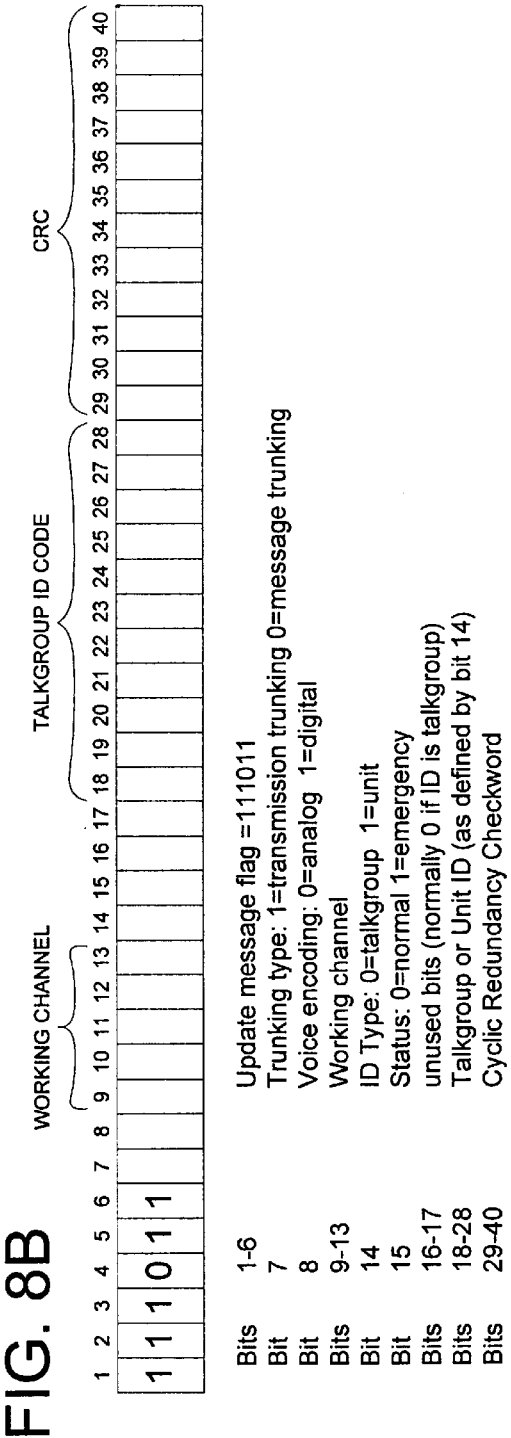

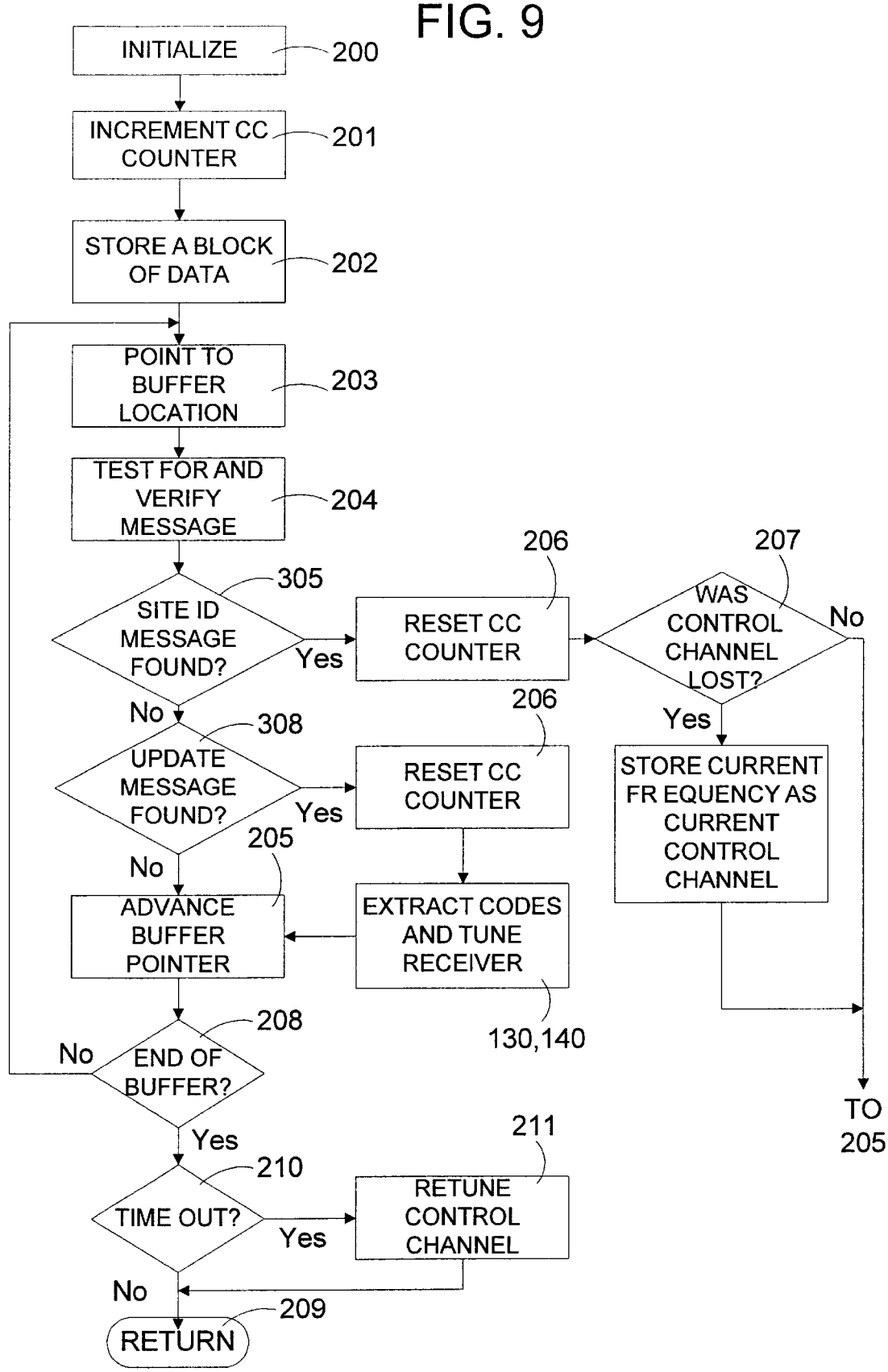

(Part One)

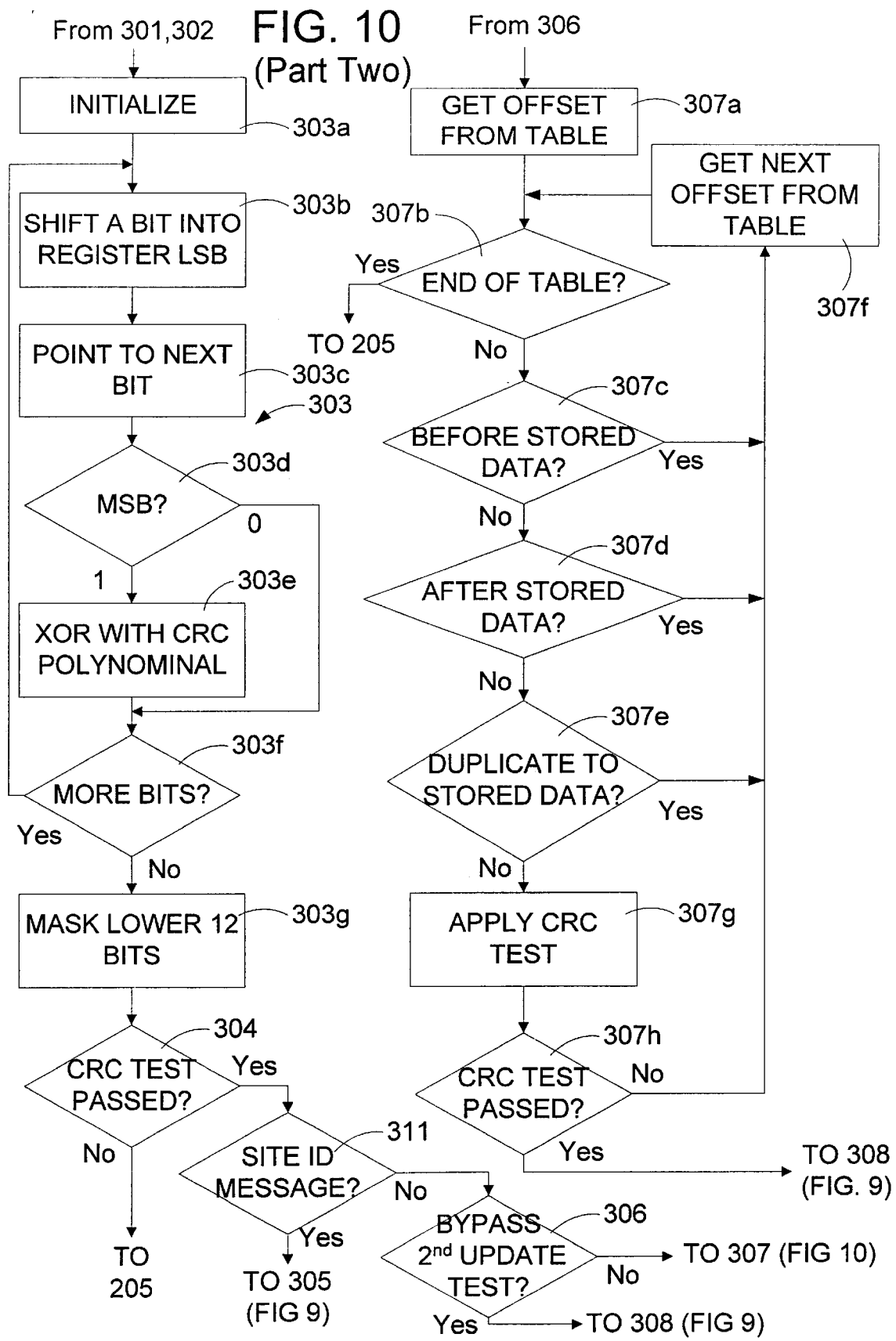
FIG. 10 (Part Two)

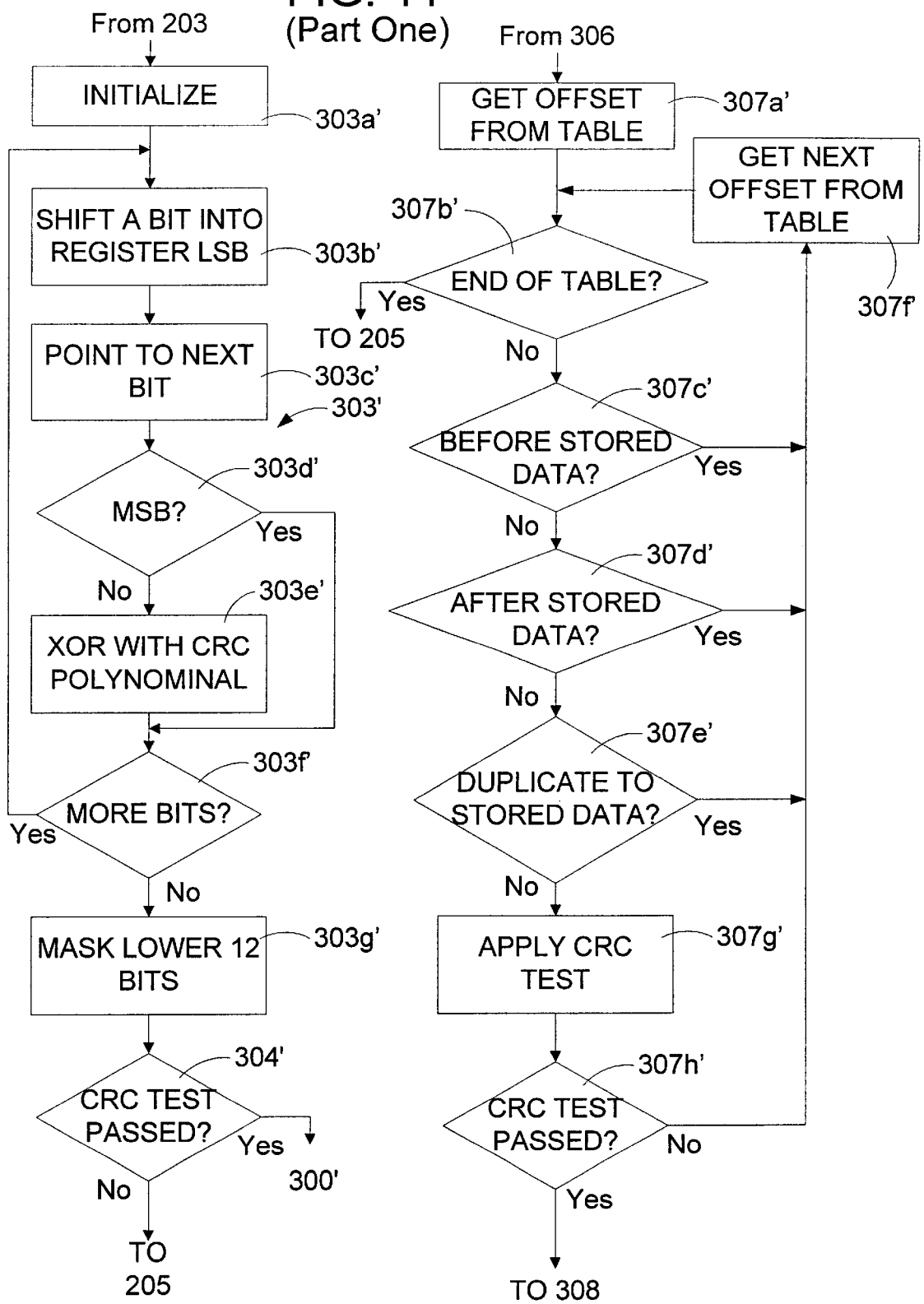

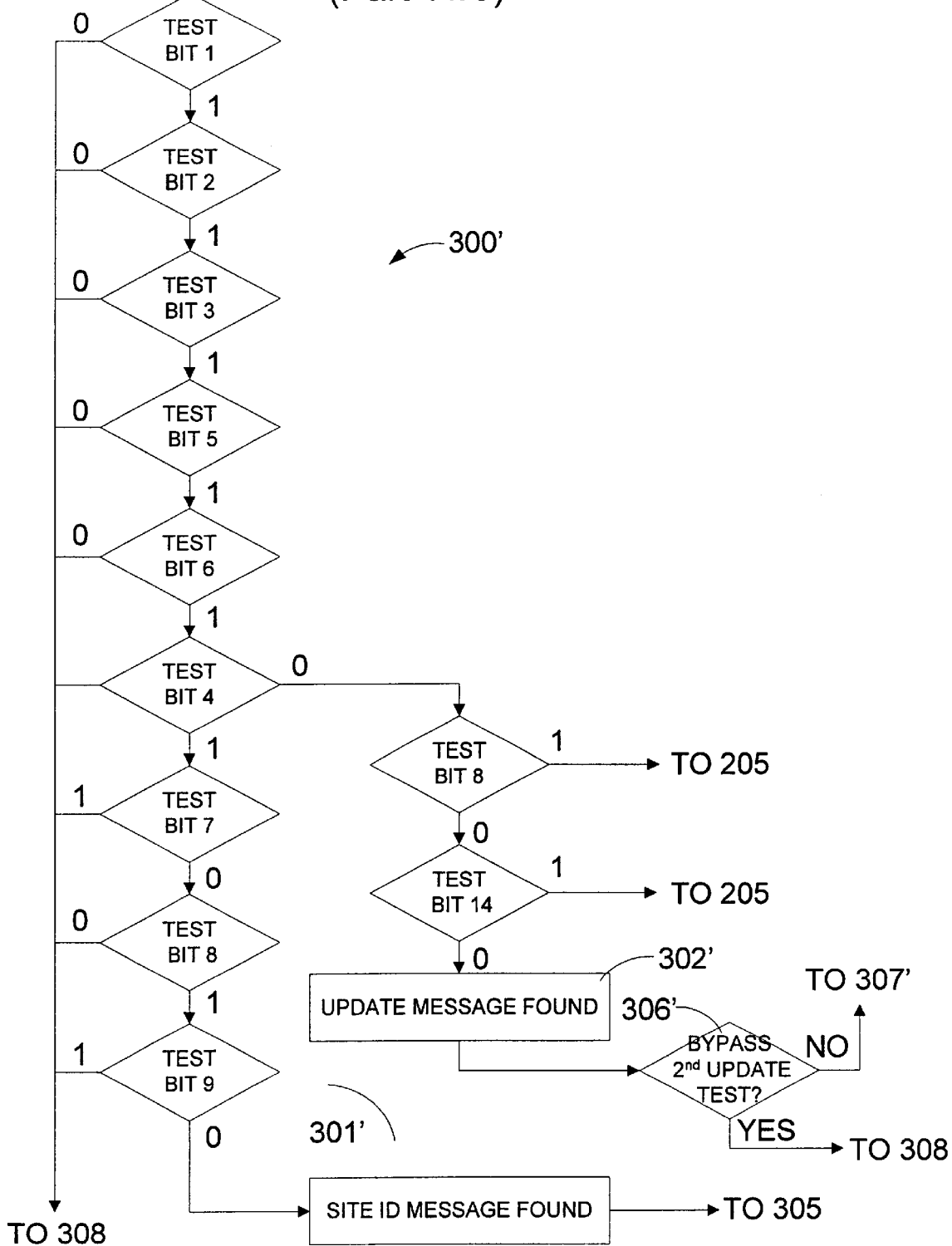
FIG. 11 (Part Two)

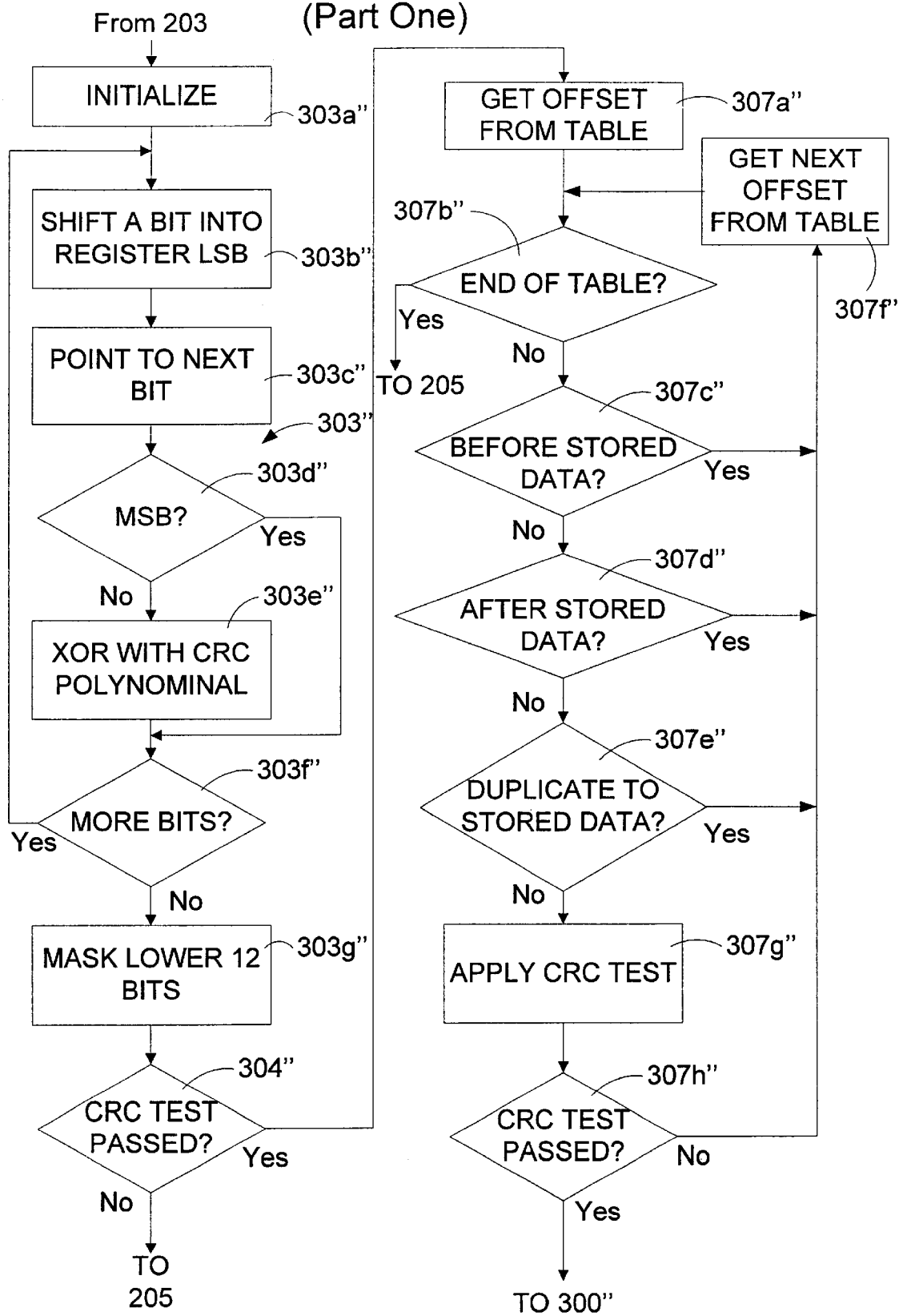
FIG. 12A (Part One)

(Part Two)

(Part One)

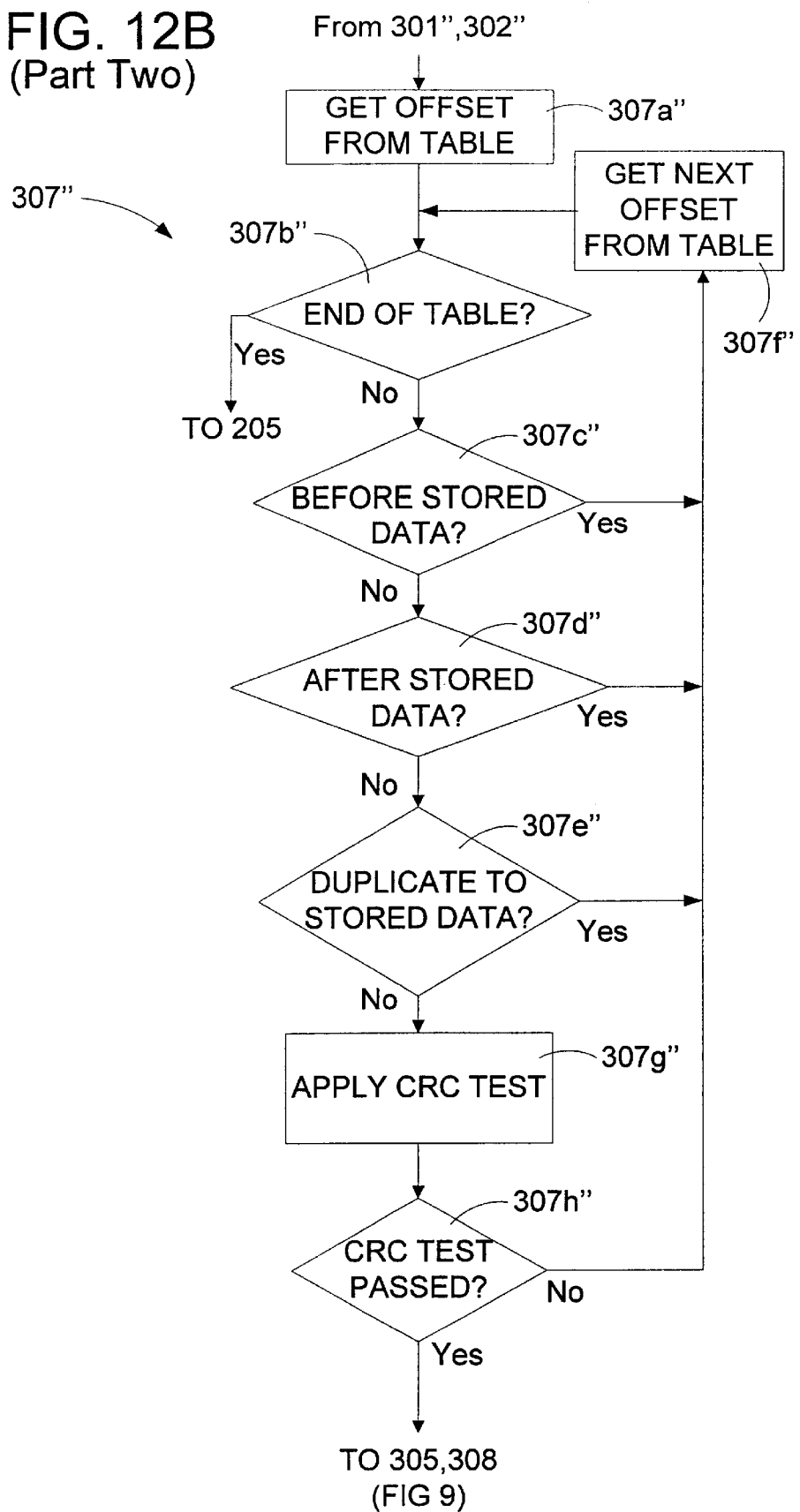
FIG. 12B (Part Two)

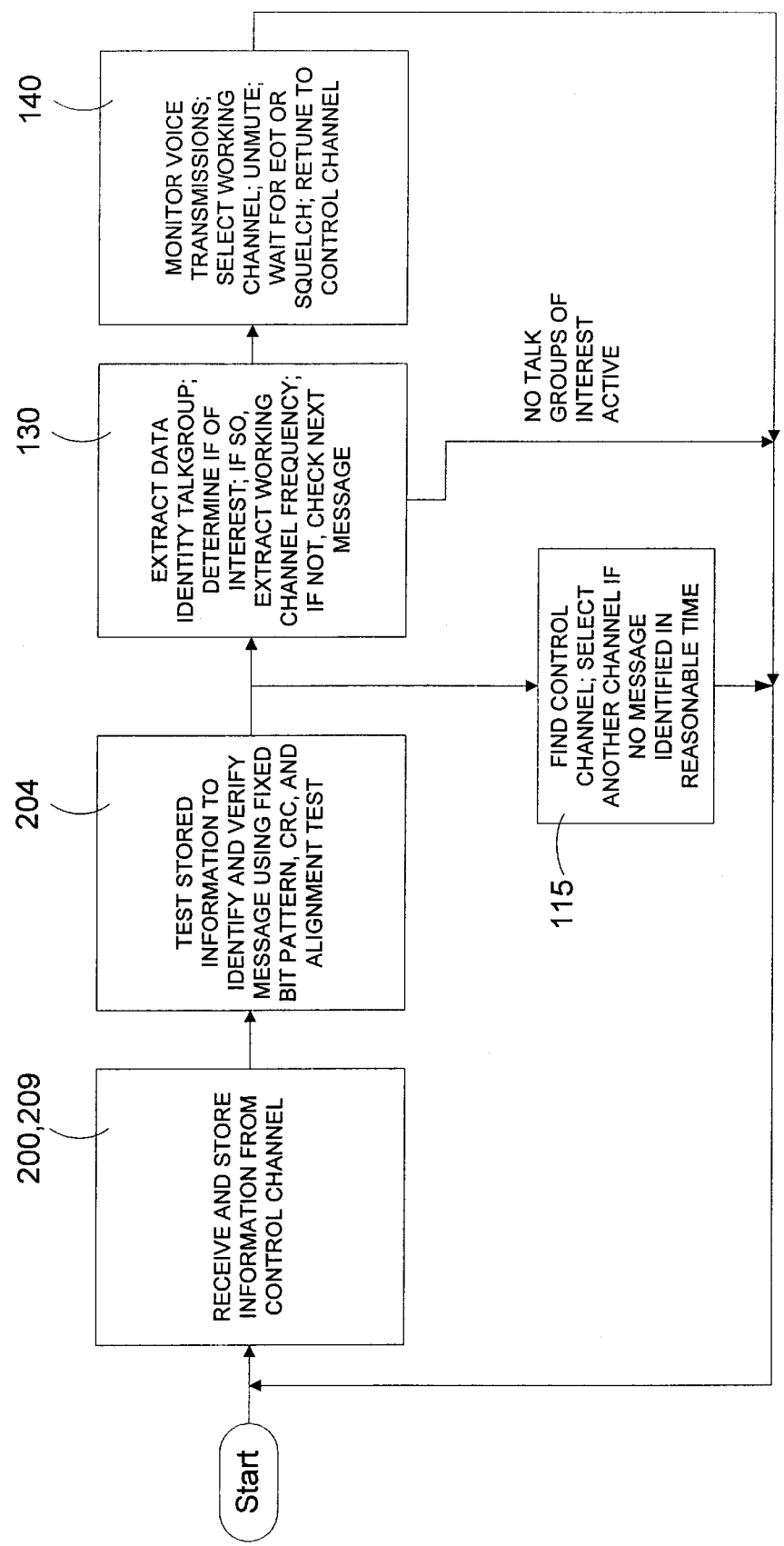

TRUNKED RADIO MONITORING SYSTEM

This disclosure is a continuation-in-part of U.S. patent application Ser. No. 08/820,338, filed Mar. 12, 1997, now U.S. Pat. No. 5,956,648.

TECHNICAL FIELD

The present invention relates to methods and apparatus for monitoring trunked radio communications.

BACKGROUND

In conventional radio frequency communications systems, communication between two parties typically occurs over a preselected channel corresponding to a single operating frequency. For example, a conventional police radio communication system may include multiple mobile transceivers and a stationary central unit at a control site. Each mobile transceiver includes circuitry for transmitting and receiving over a single channel corresponding to a single operating frequency. Alternatively, each mobile transceiver may include a channel selector switch for selecting one of several channels, i.e., frequencies, for communication. However, each communication conventionally occurs over a single frequency.

In a typical communication, a police officer may select a channel on a mobile transceiver (if channel selection is provided), for example 800 MHz, and transmit voice signals at 800 MHz to a dispatcher at the control site. The dispatcher receives the communication and responds by transmitting at 800 MHz or at another fixed frequency to which the mobile transceiver is tuned for receiving. Since the mobile transceiver is tuned to the control site transmission frequency, the police officer hears the response from the dispatcher. The police officer may then reply to the communication from the dispatcher on the selected transmitting frequency. In this manner, communication occurs over a single channel corresponding to a single operating frequency. Alternatively, transmissions from the mobile transceiver and the control site transceiver may occur on two respective frequencies in a duplex operation. Listening to these single frequency or dual frequency transmissions is easily accomplished with a conventional fixed frequency receiver.

In past years, frequency scanning receivers have permitted monitoring of multiple frequency transmissions, particularly on public safety and public service channels. The typical scanning receiver has multiple tuners or an electronically driven tuner so that each locally used frequency can be received, one transmission at a time. The receiver automatically steps from frequency to frequency, i.e., scans, stopping or dwelling on a channel in use until the transmissions on that channel cease. Then, the frequency scanning resumes. Alternatively, the listener may skip or modify scanning to listen to a particular channel even if there are interruptions in transmission on that channel.

In trunked radio communications systems, communications between two parties may occur on multiple channels, i.e., on differing frequencies, for respective transmissions. For example, in a trunked system, a police officer may transmit voice information from a mobile transceiver to the dispatcher at the control site at a first frequency. The dispatcher may respond on a second frequency. The police officer may reply on a third frequency, and so on. Digital signaling between the mobile transceiver and the control site on a separate control channel supplies each unit with the next transmission frequency for tuning both the transmitter and receiver sections of the transceivers.

Conventional scanning radio receivers are unable to monitor communication in a trunked system coherently. Scanning of frequencies in a fixed pattern produces reception of only some of the transmissions of a trunked system. Dwelling on one channel may result in reception of only one transmission of a multiple transmission communication. Thus, a conventional scanning receiver dwelling on a channel cannot reliably indicate the source of the transmission received, e.g., police, fire, rescue, etc. Moreover, since the conventional scanning receiver does not have the ability to receive, decode, and use the digital signaling information, it cannot follow the frequency changes of a particular group of transmissions, i.e., talk group. Therefore, a listener using a conventional scanning receiver can almost never hear a complete conversation in a trunked radio system.

If a conventional scanning receiver tries to monitor a trunked communication, the scanning receiver may receive a first transmission in the communication. However, the scanning receiver is unlikely to receive subsequent transmissions in communications occurring at different frequencies. For example, a scanning receiver may receive a first transmission in the trunked communication at a first frequency. When the first transmission ends, the scanning receiver may resume frequency scanning. The second transmission in the trunked communication occurs at a second frequency. However, instead of receiving that subsequent transmission, the scanning receiver may dwell on a transmission at a third frequency, most likely a transmission from another trunked or non-trunked communication system. Even if the conventional scanning receiver begins frequency scanning after receiving a first transmission and, by accident, dwells on a second frequency where the first communication continues, the scanner may be late in tuning to the second frequency so that part of the second transmission is missed. Thus, a conventional scanning receiver monitoring a trunked transmission may receive interleaved fragments of several unrelated communications from different sources or fragments of one communication.

U.S. Pat. No. 4,905,302 to Childress et al. (hereinafter Childress), the disclosure of which is incorporated by reference, describes an example of a trunked radio communications system. In the Childress system, radios send and receive digital control signals over a dedicated control channel for designating operating frequencies, i.e., working channels, for voice communications. In the Childress system, a radio initiating a communication is referred to as a calling unit. A radio to which a communication is addressed is referred to as a called unit. In order to initiate a communication, a calling unit sends a digital signal referred to as a channel request over the control channel to a control site. The control site responds by transmitting another digital signal referred to here as a channel assignment message over the control channel to the calling unit.

A channel assignment message comprises bit codes that include a channel identification code and a talk group identification code. The channel identification code indicates an assigned working channel over which a voice transmission will occur. The talk group identification code indicates the group of users intended to receive the transmission (the called units).

Once the calling unit receives the channel assignment message with a talk group identification code that matches the talk group identification code of the calling unit, the calling unit tunes to that assigned working channel for transmission and reception. The control site also sends a confirmation message on the assigned working channel. The calling unit responds by sending a verification message to the central unit over the assigned working channel. The central unit responds to the verification message by sending a command over the assigned working channel to "unsquelch" the radios of the called units, i.e., to permit reception of the voice communication. The user of the calling unit then transmits voice information. All of these exchanges are completed before voice communication and are initiated, for example, when the system user first presses the push-to-talk button on the calling unit.

Only the called units having the transmitted talk group identification code are actuated by the "unsquelch", i.e., unmuting, command and receive the transmission. Radios within the system but outside of the called talk group remain muted or tuned to the control channel for receiving other communications. Thus, the only way for a radio within the system to receive a transmission is to have a talk group identification code matching the talk group identification code in the channel assignment message of the digital control signal.

During communications in a trunked system between a calling unit and a control site, the control site continually broadcasts, on the control channel, periodic update messages. The update messages have a similar format with regard to the channel identification and talk group identification codes as the channel assignment message. However, the channel assignment message is transmitted only once upon initiation of communication over the working channel. The update message is repeatedly transmitted on the control channel during voice communication on the working channel so that transceivers in a talk group communicating on the working channel that are newly turned on, are re-establishing communication after a loss of signal, and the like, can join the talk group communications. These added transceivers join the communications "in progress" based upon detection and decoding of an update message. In this disclosure, references to a message, generically, encompasses both channel assignment messages and update messages.

Communication is terminated when the push-to-talk button on the calling unit is released. When this release occurs, the calling unit transmits an unkeyed message over the assigned working channel to the control site. The control site responds to the unkeyed message by sending a drop signal on the assigned working channel. Upon receiving the drop signal, the calling unit and the called units relinquish the assigned working channel and are tuned to monitor the control channel.

The process described is repeated for subsequent transmissions. For example, if a called unit responds to the first transmission from the first calling unit, the called unit becomes a calling unit and transmits a channel request to the control site on the control channel. The control site then assigns a working channel that may be different from the assigned working channel for the previous transmission. Because of the changes in frequencies, monitoring communication in a trunked system as described by Childress with a conventional scanning receiver is impossible for the reasons previously detailed.

In the Childress system, participating transceivers utilize complex bit codes and handshaking protocols. For example, communications over the control channel are synchronized using synchronization bit patterns preceding each transmission. Accordingly, mobile transceivers must include pattern recognition circuitry for recognizing these synchronization patterns.

Numerous other bit codes are also transmitted on the control channel in the system described by Childress. For example, a calling identification code may be included in each channel request signal on the control channel for identifying the specific calling transceiver. The calling identification code may also be included in the channel assignment messages. By using the calling identification code, the working channel assignment may include a command that enables only the calling transceiver to transmit on the assigned working channel. In that system, each mobile unit must include circuitry for transmitting and recognizing its identification code.

Another bit code transmitted on the control channel is a message code indicating whether the call is message trunked or transmission trunked. A third code may be a communication code indicating whether the call is to an individual radio or a group of radios. Individual radios in the Childress system must recognize and respond to each of these codes in order to communicate in the system.

In addition to transmitting bit codes over the control channel, the Childress system also transmits sub-audible data over the assigned working channel. This sub-audible data enables a higher priority communication to interrupt a lower priority communication that is in progress on an assigned working channel. Accordingly, transceivers participating in that system must include circuitry for detecting sub-audible data.

While the sophisticated trunked communication system has many operational advantages, monitoring trunked communications has required a complex trunked system transceiver and, therefore, has been expensive and lacking in flexibility. Further, conventional trunked system transceivers are arranged only to detect certain communications, under circumscribed conditions, and are restricted to a limited number of talk groups. Accordingly, there is a need for a simple receiver for passively monitoring a trunked radio communications system so that communications can be coherently monitored even when the frequencies of transmission change.

SUMMARY OF THE INVENTION

An object of the present invention is to provide a trunked radio monitoring system.

A further object of the present invention is to provide a method for monitoring a trunked radio communication.

Another object of the present invention is to provide an apparatus for monitoring trunked radio communications that is simple in design.

A method of monitoring communications in a trunked communication system according to the invention includes, with a frequency tunable receiver, monitoring and storing data transmitted on a control channel; testing portions of the stored data for a pattern of bits identifying a message including a channel assignment code and a talk group identification code to identify a message; upon finding a message, extracting from the message the channel assignment code and the talk group identification code; comparing the talk group identification code extracted from the message to talk group identification codes of interest and, if the talk group identification code extracted from the message is a talk group identification code of interest, tuning the receiver to a working channel corresponding to the channel assignment code extracted from the message; and monitoring voice transmissions on the working channel.

An apparatus for monitoring communications in a trunked communication system according to the invention includes a receiver tunable in frequency for monitoring digital messages on a control channel and voice communications on a plurality of working channels; a demodulator for demodulating the digital information received by the receiver on the control channel and producing demodulated signals; a first memory storing demodulated information received on the control channel; testing means for testing portions of the demodulated information stored in the first memory for a pattern of bits identifying a message including a channel assignment code and a talk group identification code to identify a message; analyzing means for extracting the channel assignment code and the talk group identification code from a message stored in the first memory; a second memory for storing talk group identification codes of interest; comparing means for comparing the talk group identification code extracted from the message to the talk group identification codes of interest stored in the second memory and for generating an indication if the talk group identification code extracted from the message matches a talk group identification code of interest; and tuning means for tuning the receiver to a working channel corresponding to the channel assignment code extracted from the message when the comparing means indicates that the talk group identification code extracted from the message is a talk group identification code of interest.

An alternative apparatus for monitoring communications in a trunked communication system according to the invention includes a control channel receiver tunable in frequency for monitoring digital information transmitted on a control channel; a voice channel receiver tunable in frequency for monitoring voice communications on working channels; a demodulator for demodulating the digital information received by the control channel receiver on the control channel and producing demodulated information; a first memory storing the demodulated information; testing means for testing portion of the demodulated information stored in the first memory for a pattern of bits identifying a message including a channel assignment code and a talk group identification code to identify a message; analyzing means for extracting the channel assignment code and the talk group identification code from a message stored in the first memory; a second memory storing talk group identification codes of interest; comparing means for comparing the talk group identification code extracted from a message to the talk group identification codes of interest stored in the second memory and for generating an indication if the talk group identification code extracted from the message matches a talk group identification code of interest; and first tuning means for tuning the voice channel receiver to a working channel corresponding to the channel assignment code extracted from the message when the comparing means indicates that the talk group identification code extracted from the message is a talk group identification code of interest.

According to another aspect of the invention, in a trunked communication system in which digital messages incorporating a talk group identification code identifying a talk group, and a channel assignment code identifying a working channel frequency on which a voice communication within the talk group takes place, are transmitted over a control channel and voice communications are transmitted over working channels that may change between communications, a method of producing a frequency map of channel assignment codes and working channel frequencies comprises monitoring a working channel frequency until a message including a talk group identification code is received on the working channel; extracting a talk group identification code from the message received on the working channel; upon extracting the talk group identification code, monitoring messages on the control channel for messages and extracting the talk group identification code and channel number of the working channel from each message received on the control channel; and comparing the talk group identification code from the message received on the working channel with the talk group identification code of a message received on the control channel and, when the talk group identification codes match, entering the working channel frequency and corresponding channel number in a frequency map.

A method of monitoring communications in a trunked communication system according to the invention includes, with a frequency tunable receiver, monitoring digital information transmitted on a control channel; testing the digital information for a pattern of bits indicating presence of a message; upon identifying the presence of a message, locating the message, and, if present in the message, extracting from the message a channel assignment code and a talk group identification code; comparing the talk group identification code extracted from the message to talk group identification codes of interest and, if the talk group identification code extracted from the message is a talk group identification code of interest, tuning the receiver to the working channel corresponding to the channel assignment code extracted from the message; and monitoring voice transmissions on the working channel.

BRIEF DESCRIPTION OF THE DRAWINGS

FIG. 2 is a block diagram of the demodulator circuit of FIG. 1 according to one embodiment of the invention.

FIGS. 3A–3F are timing diagrams of signals in the circuit of FIG. 2 and FIG. 3G indicates the bit stream of a decoded signal.

FIG. 4 is a block diagram of an alternative embodiment of the demodulator circuit of FIG. 1.

FIGS. 5A–5D are timing diagrams of signals in the circuit of FIG. 4 and FIG. 5E indicates the bit stream of a decoded signal.

FIG. 7 is a flow chart summarizing the process of FIG. 6.

FIGS. 8A and 8B illustrate formats of two messages in a particular trunked radio system.

FIG. 9 is a flow chart illustrating the identification of messages within stored data in a trunked radio system.

FIG. 11 is a flow chart illustrating tests for discriminating between message types and verifying detection of a message according to a further embodiment of the invention.

FIG. 13 is a flow chart summarizing the process of FIGS. 9, 10, 11, 12A, and 12B.

In all figures, the same elements are given the same reference numerals.

DETAILED DESCRIPTION OF THE PREFERRED EMBODIMENTS

Monitoring Receiver

Figure 1:
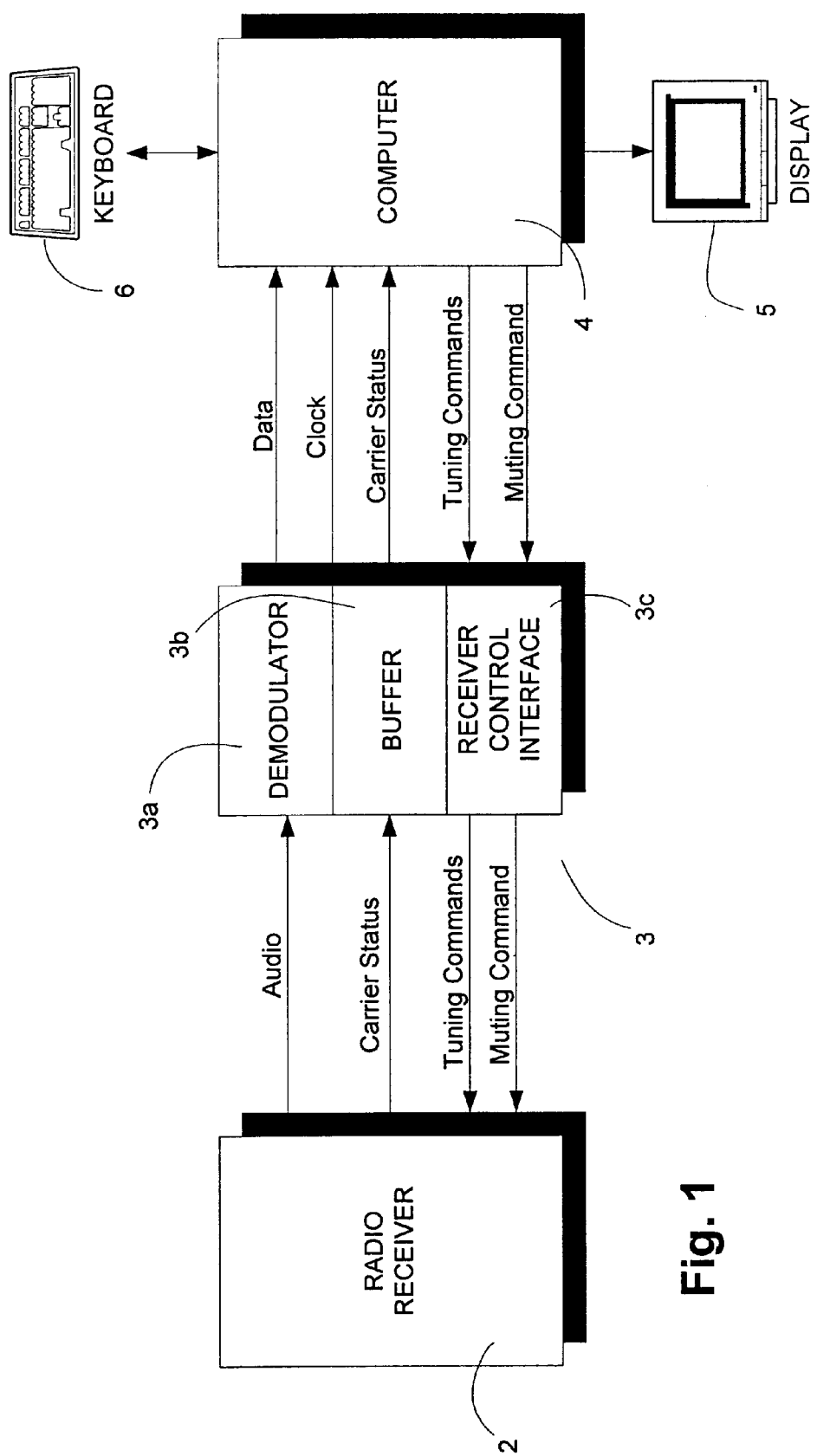
FIG. 1 is a block diagram of a trunked radio monitoring apparatus according to an embodiment of the invention.

FIG. 1 illustrates a trunked radio monitoring apparatus according to an embodiment of the invention that includes a radio receiver 2, interface circuits 3, a computer 4 including an optional display 5, such as a cathode ray tube or liquid crystal display panel, and a keyboard 6. The embodiment described monitors a GE/Ericsson EDACS trunked radio communications system (hereinafter, the GE/Ericsson system). The GE/Ericsson system includes many of the same signaling protocols described in the Childress patent. However, the invention is not limited to monitoring the GE/Ericsson system. A person of ordinary skill in the art will recognize that minor modifications may be made to embodiments of the invention described here for monitoring trunked communications using other systems.

The radio receiver 2 may be any conventional receiver for receiving RF transmissions and that is programmably tuned or otherwise electronically controllably tunable in frequency. An example of such a radio receiver that may be used in a receiver according to the invention is a Yaesu FRG9600 receiver. The Yaesu 9600 can be externally tuned and muted via a receiver control interface 3c, which is part of interface circuits 3, and may be controlled electronically or manually. Through the receiver control interface 3c, a computer 4 controls the tuning of the receiver 2. The receiver control interface 3c may be internal or external to the receiver 2.

The interface circuits 3 include a buffer 3b for level shifting between the computer 4 and the receiver 2. The computer 4 accesses the carrier signal status information in the buffer 3b to determine the presence or absence of a received carrier signal at the receiver. The interface circuits 3 include a demodulator 3a receiving an audio signal from the receiver 2 for converting the audio signal into data processable by logic devices.

FIG. 2 shows one embodiment of a demodulator 3a, a synchronous demodulator, according to the invention. A synchronous demodulator according to this embodiment separates clock and data signals from an incoming data stream and outputs a clock and a data signal synchronized with an input signal.

The demodulator 3a of FIGS. 1 and 2 receives an audio signal 11 from the receiver 2. The audio signal 11 may be digital control channel data from a trunked radio communications system or audio from such a system, or a combination of digital data and audio, depending on the tuning of the receiver 2 and the content of the signal on the channel being monitored. An example of such an input signal is illustrated in FIG. 3A. A limiter 12 limits the amplitude of the audio signal 11 and produces a conditioned signal 13 for logical processing. An exemplary conditioned signal, based on the audio signal 11 of FIG. 3A is shown in FIG. 3B. A bi-directional edge detector 14 receives the conditioned signal 13 and outputs a pulsed signal 15 that includes a short pulse at each bit transition in the input data stream, i.e., in the conditioned signal 13. The conditioned signal 13 of FIG. 3B, after detection, has the waveform of FIG. 3C. A retriggerable one shot multivibrator 16 stretches the pulses of the pulsed signal 15 output from the edge trigger to a duration of about ⅔ of a bit width. FIG. 3D shows an exemplary stretched signal 17.

A phase locked loop 18 receives the pulsed signal 15 output from the edge detector 14 and outputs a clock signal 19 synchronized with the input clock as shown in FIG. 3E. In a preferred embodiment, the phase locked loop 18 derives a 9600 bps clock from the input waveform. The preferred clock rate is 9600 bps because the control channel data rate on the GE/Ericsson system is 9600 bps. However, other data rates may be used, depending on the data rate of the control channel being monitored.

Using the phase locked loop 18 to derive the clock 19 from the input waveform eliminates circuitry for detecting synchronization bit patterns. Therefore, embodiments of the present invention can synchronize with input control channel signals without the pattern recognition circuitry included in the mobile units in the GE/Ericsson system.

A clocked latch 20 receives the clock 19 from the phase locked loop 18 and the stretched signal 17 from the one shot multivibrator 16. The clocked latch 20 outputs to the computer 4 a data signal 21 that is synchronized with the input data waveform. An example of such a waveform is shown in FIG. 3F.

In this method of demodulation, a "1" is output when the input waveform has a transition occurring between successive clock pulses and a "0" is output when there is no transition of the input waveform between successive clock pulses. The data output from the demodulator 3a is preferably in unipolar NRZ format, i.e., a zero is represented by a low signal and a one is represented by a high signal. The decoded signal obtained from the input waveform of FIG. 3A is shown in FIG. 3G. However, the present invention is not limited to the demodulation scheme of FIG. 2. Different demodulation schemes may be used depending on the format of the input data waveform.

FIG. 4 illustrates a simplified demodulator including an asynchronous sampling circuit that may be used in the invention. The edge detector 14 and the one shot multivibrator 16 of the synchronous demodulator of FIG. 2 are omitted. The phase locked loop 18 of the synchronous demodulator is replaced by an oscillator 31. However, the limiter 12 is still employed to produce the conditioned signal 13.

In the demodulator of FIG. 4, the limiter 12 conditions and limits the input data waveform from the receiver 2. The oscillator 31 generates a clock 32 for sampling the input data waveform. The clocked latch 20 receives the clock 32 and the conditioned signal 13 and outputs an output data signal 33 to the computer 4 for analysis. FIGS. 5A, 5B, and 5C depict the timing relationships of the signals 13, 32, and 33, respectively, for an example of an audio input signal 11 shown in FIG. 5A. FIG. 5E indicates the decoded signal.

In a preferred embodiment, the frequency, i.e., sampling rate of the oscillator 31 is 9600 bps. Because the oscillator 31 may not be synchronized with the input data waveform, errors may be present in the output from the demodulator; i.e., the sampled waveform may not include all of the transitions of the input waveform. However, because transmissions in a trunked radio communications system are typically redundant, error correction circuitry may be included to correct errors that may occur.

The computer 4 receives the clock and data outputs from the demodulator 3a. The computer 4 executes a control program, analyzes and decodes the data, and sends tuning and muting commands to the receiver 2. The computer 4 may be coupled to the interface circuits 3 and the receiver 2 via a serial port of the computer. The computer 4 preferably includes a display 5 and a keyboard 6 for controlling system functions. Memory requirements are minimal since the control program may be written in assembly language and is ordinarily only a few thousand bytes in length.

Although the illustrated embodiment depicts a computer 4 controlled by a program, the invention may be implemented by any device capable of decoding data and sending commands to the receiver 2. For example, an electrical circuit including logic devices performing all of the desired functions may be used to implement the invention. The electrical circuit may be integrated with or separate from the receiver 2.

Recognizing, Storing, and Analyzing Messages

Figure 6:
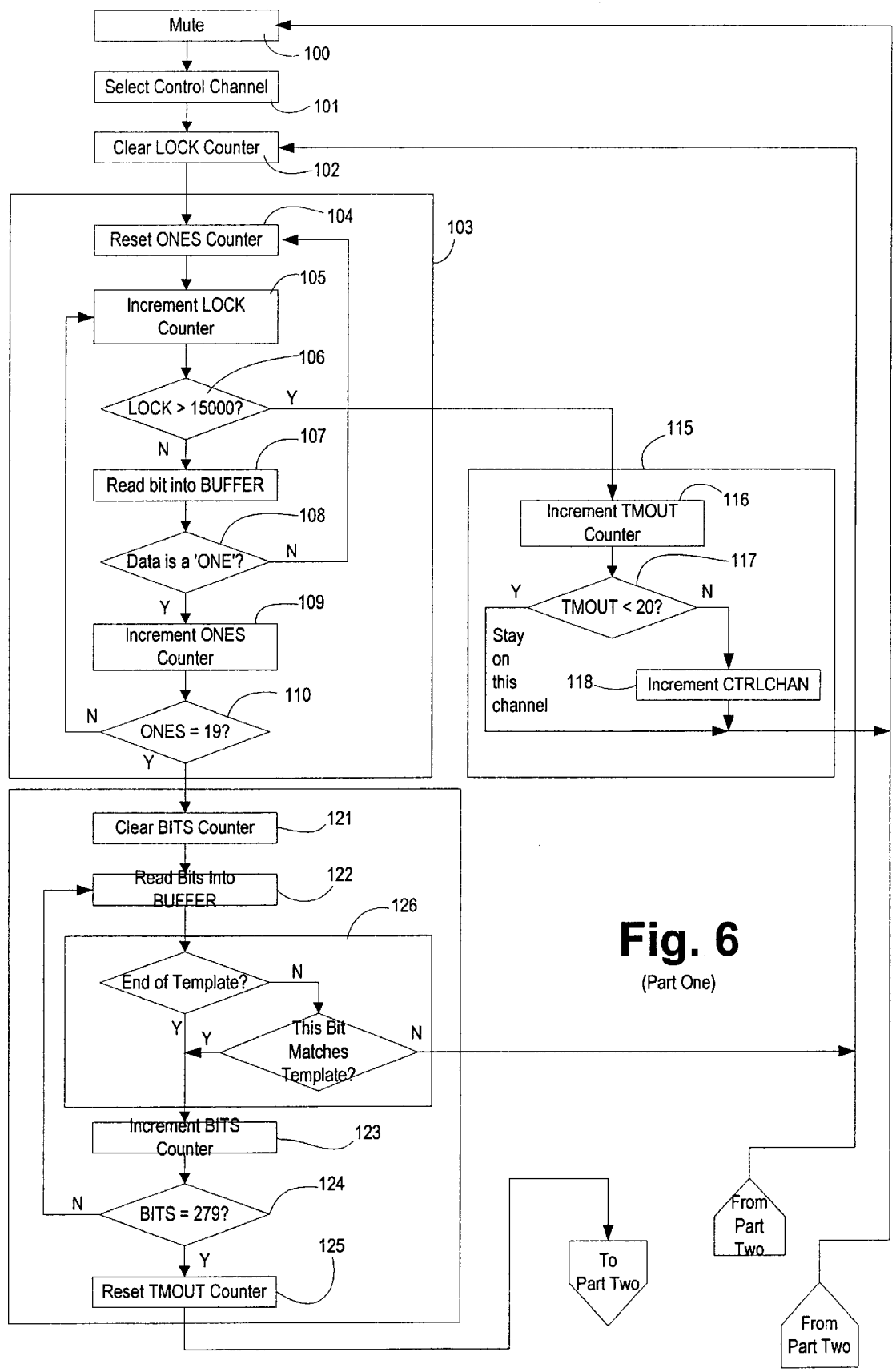
FIG. 6 is a flow chart depicting the operation of a receiver according to an embodiment of the invention.
Figure 6:
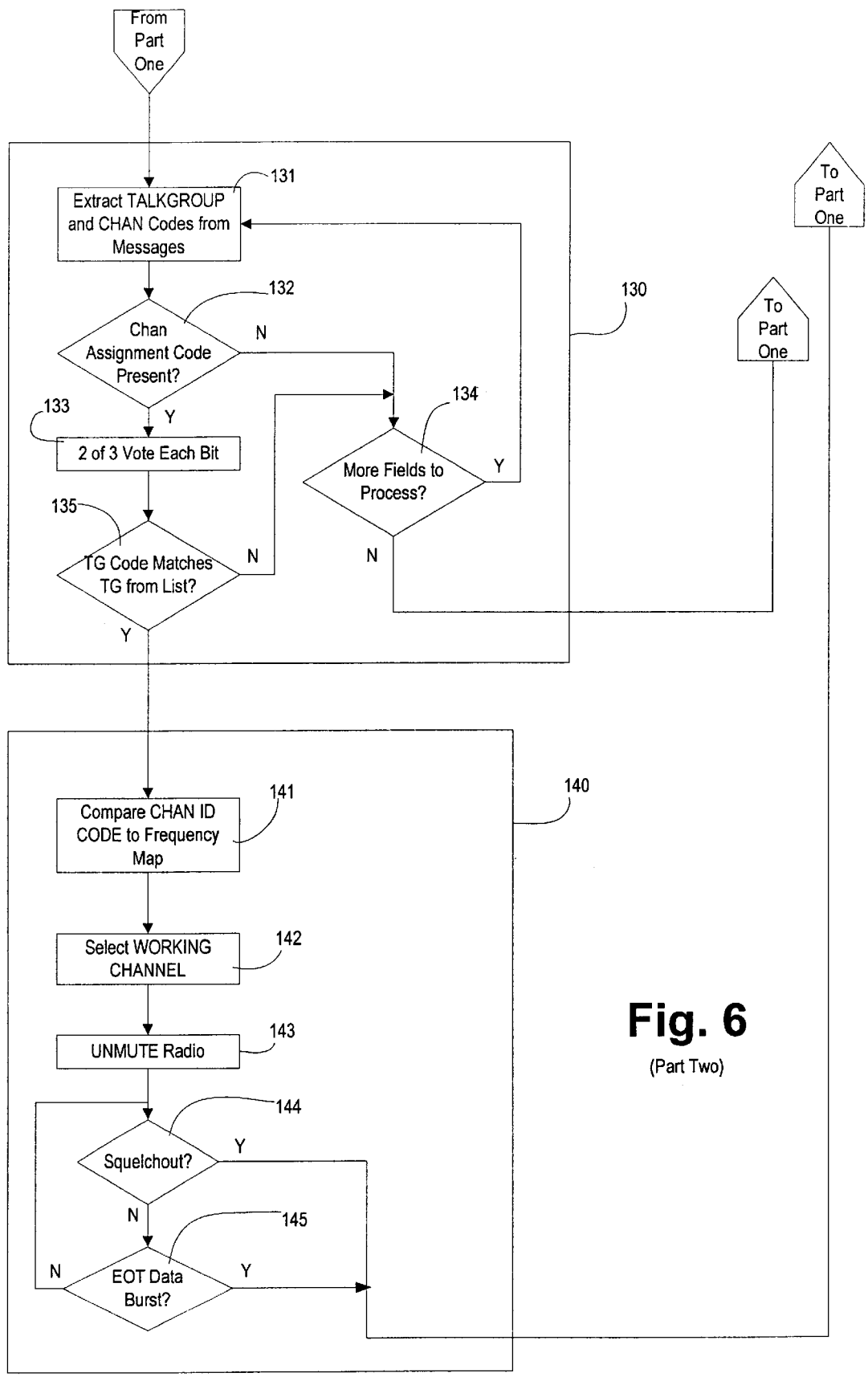

FIG. 6 is a flow chart of the operation of an apparatus according to the invention. In the illustrated embodiment, control channel data of the GE/Ericsson system is decoded. However, other trunked system control channels may be decoded within the scope of the invention. FIG. 7 is a summarized form of the complex flow chart of FIG. 6.

According to the flow chart of FIG. 6, when the receiver 2 is not monitoring a voice transmission, the receiver 2 is muted during initialization at 100. When the user desires to begin monitoring a trunked transmission, the receiver 2 is tuned to a default control channel frequency at 101. The control channel frequency may be publicly available formation, may be determined manually by a user, or may be automatically determined, as described below.

The control channel is monitored to obtain information so that the monitoring system according to the invention can follow frequency changes in a trunked communication. In the illustrated embodiment, control channel data is decoded to obtain working channel assignments, i.e., frequency and talk group identification codes for monitoring trunked communications of particular talk groups. For monitoring a system other than the GE/Ericsson system, the decoding is modified to extract equivalent bit codes, i.e., codes that contain talk group and working channel information for the communicating parties. Thus, even though the terms "channel assignment code" and "talk group identification code" are used here, the present invention is intended to include decoding of equivalent codes used in other systems.

In the GE/Ericsson system, talk group and channel identification codes are included in a channel assignment message sent to a called unit just before or just as a calling unit initiates a voice transmission and in update messages that are continually transmitted on the control channel during communication within a talk group on an assigned working channel. Following transmission of a channel assignment message, but not an update message, a brief, single handshaking transmission is transmitted. However, that handshaking information is not sought nor used in the embodiment of the invention described with respect to FIG. 6. By intercepting and analyzing the channel assignment message or, more likely, one of the continually transmitted update messages, the present invention obtains working channel and talk group identification codes.

Channel assignment and update messages are always preceded by markers, i.e., specific code identification bit patterns. These code identifier bit patterns are necessary in a trunked communication for the system transceivers to detect that essential coded information is being transmitted afterward, e.g., channel assignment and talk group identification codes, so that the transceiver properly detects and decodes that information. In the embodiment illustrated with respect to FIG. 6, the program monitors the control channel until a code identifier bit pattern is detected. In the GE/Ericsson system, the code identifier is an uninterrupted sequence of nineteen ones. That bit pattern is identified in a received control channel signal either by software or hardware, e.g., a shift register, read only memory, and multiple bit comparator. When there is a match between a marker, i.e., a first bit pattern, regardless of the system's marker format, that is stored in the receiver according to the invention, and the received control channel signal, storage of subsequent bits of the digital control channel signal takes place.

In FIG. 6, one embodiment of a process for locating a marker, i.e., the specific bit code, for the GE/Ericsson system is, for convenience, shown within the block 103. The process illustrated employs two counters, a LOCK counter employed for identifying loss of communication on the control channel or incorrect control channel tuning and a counter for counting the number of "one" bits, referred to as a ONES counter. Initially, at 102, the LOCK counter is reset to zero. Upon entering block 103, the ONES counter is reset to zero at 104. At 105, the LOCK counter is incremented and in the test 106, the contents of the LOCK counter are tested against a value, previously established, so that the process described for block 103 is not endlessly repeated without success. In a particular example, the value against which the contents of the LOCK counter are compared is 15,000. Assuming there is no overflow at test 106, at 107 a bit from the decoded signal of the control channel is read into a buffer. Then, in test 108, a determination is made as to whether that bit is a one. If that bit is a one, indicating a potential for detecting the marker used in the GE/Ericsson system, the ONES counter is incremented at 109. If the data bit is not a one, indicating that a GE/Ericsson system marker is not being detected, then the process returns to 104. In that event, the next bit of a decoded signal from the control channel is then tested in the sequence just described at 104 though 108. If a bit is determined to be a one and the ONES counter is incremented at 109, then the test 110 is applied to determine whether nineteen consecutive ones have been detected. If nineteen bits have not yet been detected, then the process returns to 105 so that subsequent bits can be tested in an attempt to identify a marker that is, in this example, nineteen consecutive ones. If, at test 110, nineteen consecutive ones have been identified so that a marker preceding a channel assignment or update message has been identified, then the process leaves block 103 and proceeds to subsequent steps for extracting further information from the channel assignment message as described below.

If, at 106, the contents of the LOCK counter exceed the predetermined maximum value, indicating an excessive number of executions of the loop at 105–110 in the process of block 103 without the identification of a marker, the process is diverted to block 115. Within block 115, in an initial step 116, a TMOUT counter is incremented. This time-out counter TMOUT counts the number of failures of the process in block 103 to identify a marker after a large number of loop processes in that block 103. If a value of the time-out counter exceeds some threshold, for example, twenty, as determined in the test 117, then it is concluded that the receiver is not tuned to an active control channel. In that event, a command is generated at 118 to change the control channel tuning to the next frequency according to a predetermined list. The list may simply be a list of frequencies with particular increments and arranged in ascending or descending order or may be a prioritized list based upon known frequencies that are used in a particular communications system or geographic area. Then, the command generated at 118 is supplied to 101 where the control channel tuning is changed and the process of block 103 is commenced again. If, however, in the test 117 the value in the TMOUT counter is less than the threshold, then it is presumed that the control channel tuning is correct and the process reverts to step 101 without a command to change the control channel. This feature of providing multiple opportunities for failure of the loop at 105–110 in block 103 without retuning of the control channel causes the system to resume monitoring rapidly in the event of an upset, such as a disruption of power to the receiver 2. Since the receiver is preferably electronically tuned, the command supplied to the receiver at 101 is a tuning command that causes the receiver to be retuned to the same control channel frequency previously employed.

Alternatively, the steps just described may be employed for automatically finding the active control channel frequency. Initially, at 101, the receiver is set to an arbitrary system frequency and then blocks 103 and 115 are repeated until the receiver is tuned to an active control channel so that nineteen ones, in the GE/Ericsson system, are ultimately identified in test 110.

After identification of the marker, i.e., the code identifier bit pattern, then the following bits of the channel assignment or update message are stored for subsequent data processing. These steps are illustrated within the block 120 of FIG. 6. Initially, a BITS counter is reset to zero in order to count the number of bits including and following the code identifier bit pattern that are to be stored. Each bit is serially read into a buffer at 122. Thereafter, unless an optional process described below is carried out, the BITS counter is increased for each received bit at 123. In test 124, the number of bits read in is compared to the number of bits desired to be stored. In this embodiment, for the GE/Ericsson system, for example, it may be desirable to store at least two hundred seventy-nine bits following the nineteen bit marker. If all of the desired number of bits have not yet been read in, then the test 124 returns to 122 for the reading in process to continue. Once the desired number of bits have been read in, as indicated by test 124, then the TMOUT counter is reset at 125. The TMOUT counter is the counter employed at 116 of block 115, previously described. Then, the process exits from block 120 to the next major process of extracting talk group and channel assignment information from the stored data.

In some trunked communication systems there may be additional bit patterns having a fixed format. For example, in the GE/Ericsson system, the next twenty-six bits after the marker, i.e., the code identifier bit pattern, have a particular format that may be compared to a template for error checking. When the format of data in a particular trunked communication system provides an opportunity for this kind of error checking, a process, such as the process indicated in block 126 within block 120 may be carried out. As indicated in test 127, the number of bits read in is subjected to a secondary count for comparison to a template. At each bit before the end of the template, in test 128, a comparison is made between the expected value of the bit depending upon its location in the sequence and the template. If the detected bit is correct, according to this comparison in test 128, the process proceeds to 123. If the test 128 shows disagreement, for example because of fading in the received signal, then the process exits blocks 126 and 120 and reverts to 102. Then the entire process of block 103 begins again and continues until a sufficiently strong signal is detected, assuring that both the code identifier pattern and the subsequently transmitted second bit pattern that are present in a particular trunked communication system are accurately received.

Once the control channel is located and the code identifier bit pattern has been successfully detected and data received on the control channel (e.g., the two hundred seventy-nine bits containing two messages and, most likely, the channel assignment and talk group identification codes) is stored at 125. After 125, analysis of the stored data begins in block 130. The stored data are analyzed by extracting information from specific locations to determine if a channel assignment code is present. If a channel assignment code is present, then the process continues; otherwise, if all sources of channel assignment codes in the stored data are exhausted without identifying a channel assignment code, the process reverts to 102.

In the GE/Ericsson system, the channel assignment code is a five bit sequence appearing at a specific location in a data structure in relation to the marker (the first specific bit pattern) that initiates a channel assignment or update message, and the talk group identification code is an eleven bit code appearing at a second specific location in the data structure. For example, in the GE/Ericsson system as described in the Childress patent, the channel assignment code is located at bits 12–16 in a channel assignment message, and the talk group identification code is located at bits 17–28 in the channel assignment message. Other trunked communications systems may use different length codes in different locations in a data structure. In a receiver according to the invention, working with a non-GE/Ericsson system, the locations of the channel assignment and talk group identification codes are known and putative codes are extracted from the stored control channel data in an analogous manner.

In the GE/Ericsson system, the control channel data structure includes many other bit codes, for example, individual radio identification codes. However, in the embodiment of the invention described above, only the channel assignment code and the talk group identification code need to be extracted from the stored data. In this manner, the present invention avoids unnecessary complexity in decoding circuitry and/or steps, yet extracts sufficient information from the control channel to follow a trunked communication as the frequency of a specific communication changes. In non-GE/Ericsson systems, the channel assignment and talk group identification codes are similarly extracted by knowing their lengths and positions within an information frame that is part of the stored data.

A process of extracting channel assignment and talk group identification codes from stored data is illustrated in block 130 of FIG. 6. Initially, at 131, information is extracted from two different locations within the stored data in an attempt to identify channel assignment and talk group identification codes. In test 132, a determination is made as to whether the extracted information has the form of a channel assignment code.

If the form is proper, then optional error correcting steps for checking the accuracy of the channel assignment code may be carried out. For example, in the GE/Ericsson system, channel assignment and talk group identification codes are transmitted with three-fold redundancy. Data is extracted from each of the three locations in an information frame where the channel assignment codes should be located. For each of the three putative channel assignment codes, if at least two of the three extracted codes for the channel assignment code and two of the three extracted codes for the group identification code match on a bit-by-bit comparison basis at 133, the process continues. The third or non-matching channel assignment code is rejected and the process moves to 135 using the matching codes. As an alternative error checking procedure, a three-fold match of codes instead of 133 may be required for a valid code extraction. Then, the process of FIG. 6 proceeds to 135. If there is no three-fold match in this alternative, the process may reject all of the extracted channel assignment codes and talk group identification codes and return to 103 through 134. As a further alternative, the channel assignment and update messages can include a BCH checkword that can be analyzed to check for and, possibly, correct errors. While error detection and correction is preferred, there is no requirement that a system according to the invention include any error checking code or step.

If at test 132 the information extracted from the stored data does not have the proper form of a channel assignment code, then a further test is made at test 134 to determine whether there are other fields within the stored data from which channel assignment codes can be extracted. In other words, all data blocks within the stored data are exhausted before the data extraction process is abandoned. If there are more fields to check, then the process reverts to 131. If all fields within the stored data that may contain channel assignment codes and talk group identification codes have been exhausted, then test 134 reverts to 102 of the process of FIG. 6.

In test 135, the extracted talk group identification code is compared to a list of talk group identification codes of interest stored in a memory to determine whether to monitor a communication. Each talk group has a unique talk group identification code. For example, certain police transceivers may have a talk group identification code of 00011001101. Thus, every channel assignment and update message addressed to a police transceiver in that talk group would contain the talk group identification code 00011001101 and all transmissions except those addressed to talk group 00011001101 would be ignored by police transceivers. As discussed below, this eleven bit talk group identification code pertains to a specific group of transceivers. This talk group identification code may include a hierarchy of identifiers, comprising groups of bits. For example, if three such groups are used in such a hierarchy, one group may generically identify police communications, a second group may identify communications for a particular police operation, and a third group, i.e., all eleven bits, may identify the specific talk group units, for example, a geographical region of transceivers for a particular police operation. As used here, talk group identification code generally refers to the most specific code, i.e., eleven bits in the GE/Ericsson system. However, matching of fewer than all bits of a talk group identification code in order to monitor communications between transceivers of related talk groups is within the scope of the invention. In other words, the talk group of interest may be identified by fewer than all bits so that a wider range of communications than those of a single talk group may be monitored. Test 135 encompasses an eleven bit test for the GE/Ericsson system as well as a test of fewer than eleven bits.

The extracted talk group identification code is compared to the stored list of groups of interest. If there is a match at test 135, then the channel assignment code is used to tune the receiver to receive the communication of the identified talk group of interest, as described below. If no talk group identification code of interest is detected at test 135, the process returns to test 134. If more fields remain in the stored data for extraction, then the process of block 130 is repeated. For example, in the GE/Ericsson system, two update messages may be sent together, sequentially. Test 134 ensures that both messages have all possible codes extracted so that if the first message does not produce a channel assignment code or if no talk group identification code of interest is found in the first message, the same codes are sought in the second message. If all fields of interest in the stored data have already been extracted, then the process returns to 102.

A user may develop a list of talk group identification codes manually by monitoring the content of transmissions using a conventional scanning receiver while monitoring the control channel with a receiver according to the present invention that displays talk group identification codes. For example, if a receiver according to the present invention detects a channel assignment including a talk group identification code of 00011001101, and the channel assignment is immediately followed by a voice transmission with police information, such as the user hears on a conventional scanning receiver, the user may determine that the talk group identification code 00011001101 corresponds to a law enforcement agency. Alternatively, talk group identification code data may be publicly available. Once the user determines a list of talk group identification codes, one or more codes may be specified and stored, through and in the computer 4, identifying the talk groups of interest so that their communications can be received.

Generation of Frequency Map

If the talk group identification code extracted from the control channel data indicates a desired code (i.e., a code for one of the groups that the user desires to monitor), the process of FIG. 6 moves to block 140 to begin receiving a voice transmission. In order to determine the frequency at which the voice transmission will occur, at 141 the channel assignment code is compared to a frequency map. The frequency map contains a list of channel assignment codes and a corresponding operating frequency for each channel assignment code. The frequency map may be produced automatically by the computer or manually by a user. In one example, an operating frequency can be paired with a channel assignment code without monitoring the content of a voice transmission. A user may monitor the control channel until a channel assignment code is detected. The user may then monitor a transmission and determine its frequency using a conventional scanning receiver. The frequency at which the transmission occurs is the operating frequency corresponding to that channel assignment code. The user then manually pairs the frequencies and the channel assignment codes.

Alternatively, the receiver may monitor the activity patterns on the control channel of a trunked communication system and voice transmissions on the working channels of the system and develop the frequency map automatically.

The GE/Ericsson system may periodically transmit, on the control channel, information giving the relationship between system channel numbers and FCC frequency codes. That information, i.e., the frequency map, may be received and recorded as a further alternative for constructing the frequency map automatically.

As another method of generating a frequency map, each working channel may be separately monitored. An initial transmission on a working channel includes the talk group identification code. Once a transmission is received on a working channel, the talk group identification code is captured during the initial handshake. Then, the receiver is immediately tuned to the control channel which periodically transmits update messages, described in more detail below, reporting which talk groups are using which working channels. The update message includes the channel number of the working channel. When a talk group identification code match is found in the update message, since the working frequency is known, the channel number from the update message is paired with the working channel frequency. Thus, an entry on the frequency map, i.e., channel number and corresponding frequency, is produced. The process is repeated until the frequency map is completed. This frequency map generation method is preferred because only one frequency transmission on each working channel is needed to provide each entry on the map. This technique can be automated or can be manually performed.

Once the channel assignment code is extracted and the corresponding frequency determined via the frequency map, the receiver 2 is tuned to that frequency at 142 and an unmute command is sent to the receiver at 143 to enable the user to hear a voice transmission. Although the process of detecting the first bit pattern data, storage, and data extraction and analysis may seem to require many steps, the process occurs very quickly. Thus, the receiver 2 is rapidly retuned from the control channel to the assigned working channel and there is little or no loss of the voice communication of the talk group being monitored.

Termination of Communications

The receiver 2 monitors a voice transmission until there is a loss of carrier or end-of-transmission data burst indicating the end of a transmission. A loss of carrier may be caused by a loss of communication due to obscuring of the communication path by a natural or man-made object, or by some other factor. This loss of carrier effectively ends the transmission, requiring a new working channel assignment. Thus, upon a determination that the signal is lost, the process reverts from block 140 to 100 as shown in FIG. 6. In block 140 of FIG. 6, loss of carrier is equivalent to "squelch out" of test 144. As long as the carrier is present, the process continues to test 145 which monitors for an end-of-transmission (EOT) data burst. These two tests continue in an endless loop until either the carrier is lost or the end-of-transmission data burst is received. Upon the occurrence of either event, the process returns to 100 of FIG. 6.

An end-of-transmission data burst is sent by the system on the working frequency indicating the end of a voice transmission when the calling unit un-keys. In a preferred embodiment of the present invention, a voice transmission is monitored until a third bit pattern is received, the end-of-transmission data burst indicating the end of that transmission. In the GE/Ericsson system, the third bit pattern is transmitted on the assigned working channel and detected in test 145 using a process similar to that of block 103, without step 105 and test 106.

Once the receiver/computer detects either a loss of carrier or an end-of-transmission data burst, the receiver is muted at 100 and tuned to monitor the control channel. In other words, the process of FIG. 6 returns to steps 100 and 101 and begins testing the control channel for the first bit pattern indicating that channel assignment and talk group identification codes may follow. The process of FIG. 6 is summarized in FIG. 7 where blocks 103, 115, 120, 130, and 140 appear with their overall functions indicated but without the detailed steps of FIG. 6.

Continuous Monitoring of Control Channel; Prioritization of Communications Monitoring Although the embodiment described above monitors the control channel between voice transmissions, in an alternative embodiment, the control channel may be monitored continuously. For example, the receiver 2 of FIG. 1 may include two monitoring circuits: a control channel monitoring circuit and a voice channel monitoring circuit. The control channel monitoring circuit monitors the control channel continuously, and the voice channel monitoring circuit is tuned in frequency upon receiving a new working channel assignment from the control channel through the control channel monitoring circuit for a talk group being monitored. By continuously monitoring the control channel, a priority reception system can be implemented. By continuously decoding channel assignment and talk group identification codes, the identification codes can be compared to a prioritized list of talk group identification codes. When the talk group identification code of a talk group having a higher priority than the talk group currently being heard is detected, the computer retunes the receiver, even in the midst of a voice communication, to the channel of the higher priority communication. In this embodiment of the invention, once the control channel frequency is established, the tuning of the control channel monitoring circuit is not changed from the fixed control channel frequency.

A preferred embodiment of a receiver control process according to this embodiment of the invention uses the same steps as in the flow chart of FIG. 6. In addition, in block 140, after test 135, a test is made, based upon a priority list of talk groups of interest, as to whether a newly identified talk group has a higher priority than the talk group currently being monitored, if any. If the talk group corresponding to the talk group identification code just decoded is of lower priority than the talk group currently being monitored, i.e., for which a communication is currently being received, then the process reverts to 102. Thus, the tuning of the voice channel monitoring circuit is maintained without change. However, if it is determined that the most recently decoded talk group identification code represents a talk group having a higher priority than the talk group currently being monitored by the voice channel monitoring circuit, the process moves to 141 as if no talk group were presently being monitored. The voice channel communication circuit is newly tuned to the channel indicated in the frequency map based upon the newly extracted channel assignment code at 142. Thus, the voice channel communication receiver immediately changes to the higher priority voice channel, even in the course of monitoring another, lower priority voice communication for another talk group on a different channel. The voice channel monitoring circuit remains tuned to the higher priority communication until interrupted by a still higher priority communication or until the current communication ends as detected in test 144 or test 145. Upon loss of a signal of interest or detection of an end-of-transmission data burst, the talk group identification code being monitored is reset to a default value, i.e., the talk group of lowest priority. Then, the process reverts to 102.

Recent channel assignment and update messages are preferably displayed to the user, including talk group and channel identification codes, on the display 5. This feature enables a user to identify which talk groups are currently communicating and to control the receiver to monitor a specific talk group.

Storing, Recognizing, and Analyzing Messages

The foregoing embodiments analyze information transmitted on the control channel based upon detecting a first bit pattern in the information and thereafter storing received information for analysis. A channel assignment code and a talk group identification code are extracted from the stored information. However, the information transmitted on the control channel can be stored without any condition of first detecting a particular bit pattern and subsequently analyzed to obtain a channel assignment code and a talk group identification code, provided a sufficiently long string of data is stored to enable effective analysis. A description of such an embodiment follows. To the extent not described as different, this embodiment uses the processes and apparatus previously described.

In the GE/Ericsson system, information on the control channel is transmitted in continuous frames two hundred eighty-eight bits in length. The marker, discussed for the previous embodiment, is part of a leading section of the frame that includes forty-eight bits. These forty-eight bits are followed by two messages. Each message is forty bits in length and is repeated three times. The first message, forty bits in length, appears three times sequentially with the message inverted in the second position, i.e., all of the ones and zeros of the first position reversed. The third position of the first message is transmitted in non-inverted form. The three forms of the first message occupy one hundred twenty bits. Likewise, the second message is transmitted three times, in a non-inverted, inverted, and non-inverted form. This second message transmission occupies another one hundred twenty bits. Thus, the two hundred eighty-eight bit frame includes the forty-eight bit preamble and two one hundred twenty bit parts, each including a forty bit message repeated three times.

Examples of two kinds of the forty bit messages are illustrated in FIGS. 8A and 8B. Each of these messages is distinguished by flag bits at the leading part of the message. FIG. 8A shows a site identification message. This message is characterized by nine flag bits having a fixed format of 111111010. For the purposes of this description, the other important information within the site identification message comprises bits 12–16 which designate the working channel assignment indicating the number assigned in the system to the particular channel, i.e., the working frequency according to the frequency map, that is in use. Further, a cyclic redundancy checkword (CRC) is present in bits 29–40. Identification of the site identification flag bits confirms that the receiver is tuned to the control channel.

A second important message type is illustrated in FIG. 8B, the update message. The update message is distinguished by six flag bits in the leading part of the message and having the form 111011. The update message contains substantial important information. For example, the trunking type, the encoding type (analog or digital), and the priority of communication is contained in the update message. Of particular importance are the designation of the working channel, information appearing at bits 9–13 of the forty bit message. Further, the talk group identification code appears in bit positions 18–28. Finally, as in the site identification message, bits 29–40 are devoted to a CRC. The update and site identification messages are not the only messages transmitted on the control channel in the GE/Ericsson system. However, these two messages contain information that is useful in tracking frequency changes of working channels and monitoring continuing communications of a particular talk group.

In this embodiment, initially, information is stored from a transmission on the control channel. Preferably, at least one complete frame is stored. More preferably, two complete frames, i.e., at least five hundred seventy-six bits in the GE/Ericsson system, are stored. However, adequate data analysis, i.e., identification of working channel frequency for a particular talk group from an update message, can be achieved for the GE/Ericsson system if fewer than two hundred eighty-eight bits are stored or more than one thousand twenty-four bits are stored. Too few stored bits may provide inadequate data for message analysis and too many stored bits may slow the data analysis process, but there are no absolute upper and lower limits on the number of bits that must be stored for the invention to function.

Fundamentally, in the data analysis, various techniques are used to identify either flag bits or a CRC indicating the presence of an update message or a site identification message. Which ever of the flag bits or CRC is not used for message identification can be used to verify a message. The flag bits are identified from their respective fixed patterns, either by software or hardware, e.g., a shift register, a read only memory, and a multiple bit comparator. When flag bits identifying a particular message are found, any of numerous verification tests, such as a check of the CRC, can be applied individually or in sequence to confirm that a desired message has been identified so that the information of interest can be extracted from the message. Alternatively, when a CRC is found indicating the potential presence of a message, not the accuracy of the transmission of data, the verification test may test for the fixed pattern of flag bits. In concept, the location of a message, which is known to be forty bits in length, as illustrated in FIGS. 8A and 8B, is sought in the data, stored or in real time, by applying particular tests to each consecutive forty bit segment of the stored information. If a forty bit string of information fails the test, then, from the data that is being examined, the forty bit string is shifted by one bit, eliminating one of the previously tested bits and adding a new, previously untested, bit and the same tests are again applied. When the tests have been successfully passed, then the desired information, for example, talk group identification code and/or channel assignment code, is extracted from the forty bit message.

It is possible for some errors to occur even in applying the two sequential tests, e.g., flag bit pattern and CRC tests, and it may be desirable to apply additional tests to eliminate the few errors that may occur due to the presence of random data in a control channel transmission. These further tests can, for example, take advantage of the presence of the same message three times in non-inverted, inverted, and non-inverted form or by searching for other messages at specific bit position offsets with respect to the putative forty bit message that has been detected. For example, in the described two hundred eighty-eight bit frame, other non-inverted messages will be found at offsets of −168, −88, +80, and +120 bits with respect to a detected forty bit message, considering the forty-eight bit preamble. −88 bits would be, for example, the location of the third repetition of a second message in a previous frame. In other words, in this further verification test, previous messages as well as subsequent messages can be tested for verification. Depending upon the length of the data stream stored, still other locations will also include non-inverted messages. Because of the structure of the site identification messages including a larger number of flag bits than in the update message, it is usually sufficient to apply only the flag bit test and the CRC verification to avoid an unacceptable number of errors. On the other hand, since an update message has fewer flag bits, it is preferable to add a second verification test, for example, testing for other non-inverted messages at specified offsets, as discussed above, to avoid an unacceptable number of errors.

A particular implementation of one embodiment of the process for obtaining working channel frequencies and talk group identifications so that trunked radio communications can be continuously monitored is illustrated in the flow chart of FIG. 9. According to that flow chart, while the receiver 2 is muted, the operation is in an initialized state at 200. When a user desires to begin monitoring a trunked communication, the receiver 2 is tuned to a default control channel frequency and a control channel counter is incremented at 201. The control channel frequency may be publicly available information, may be determined manually by a user, or may be automatically determined as discussed elsewhere in this description. The apparatus then stores a block of the digital data stream received on the control channel at 202. As described above, the total length of the stored data stream most preferably includes at least two continuous frames of data, although longer and shorter blocks of data may be stored in successful implementations of this embodiment of the invention.

A pointer points to a buffer location at 203, essentially selecting a window, referred to here as a buffer window, of forty sequential bits from the stored data stream in order to test those bits to determine if they contain a message of interest. The initial location of the pointer in relationship to the contents of the buffer is insignificant because, in each test iteration, the pointer is repositioned, incrementing by one bit in each repositioning, until all the stored information is tested or until a message of interest is located. The position of the pointer indicates the beginning bit of a buffer window forty bits wide in the GE/Ericsson system implementation.

In order to determine whether a message of interest is present in a buffer window, the apparatus applies various tests at 204. One embodiment of this testing is illustrated in detail in FIG. 10 and another embodiment is illustrated in FIG. 11. These processes are summarized in the flow chart of FIG. 12. The tests 204 locate and verify messages in the data stream received on the control channel and stored in the buffer. Because a random block of data received on the control channel is stored in the buffer, the position of messages in the data stream is initially unknown. Thus, every sequential group, i.e., buffer window, of forty bits is considered to be a possible message of interest. In each step, sequential tests are applied to determine if various forty bit segments of the stored data contain a message of interest. The sequential tests of the embodiment of FIG. 10 are described first.

Flag Bit Testing and CRC Verification

Initially, at 300, potential update messages and potential site identification messages are located by testing the leading bits of the buffer window against two templates of flag bits corresponding to the patterns of flag bits of the two messages of interest, as shown in FIGS. 8A and 8B. If the testing fails to identify a potential message of interest through leading bit pattern matching, the process returns to 205 where the pointer is incremented so that the next forty bit sequence of data can be subjected to the same flag bit testing.

Figure 10:
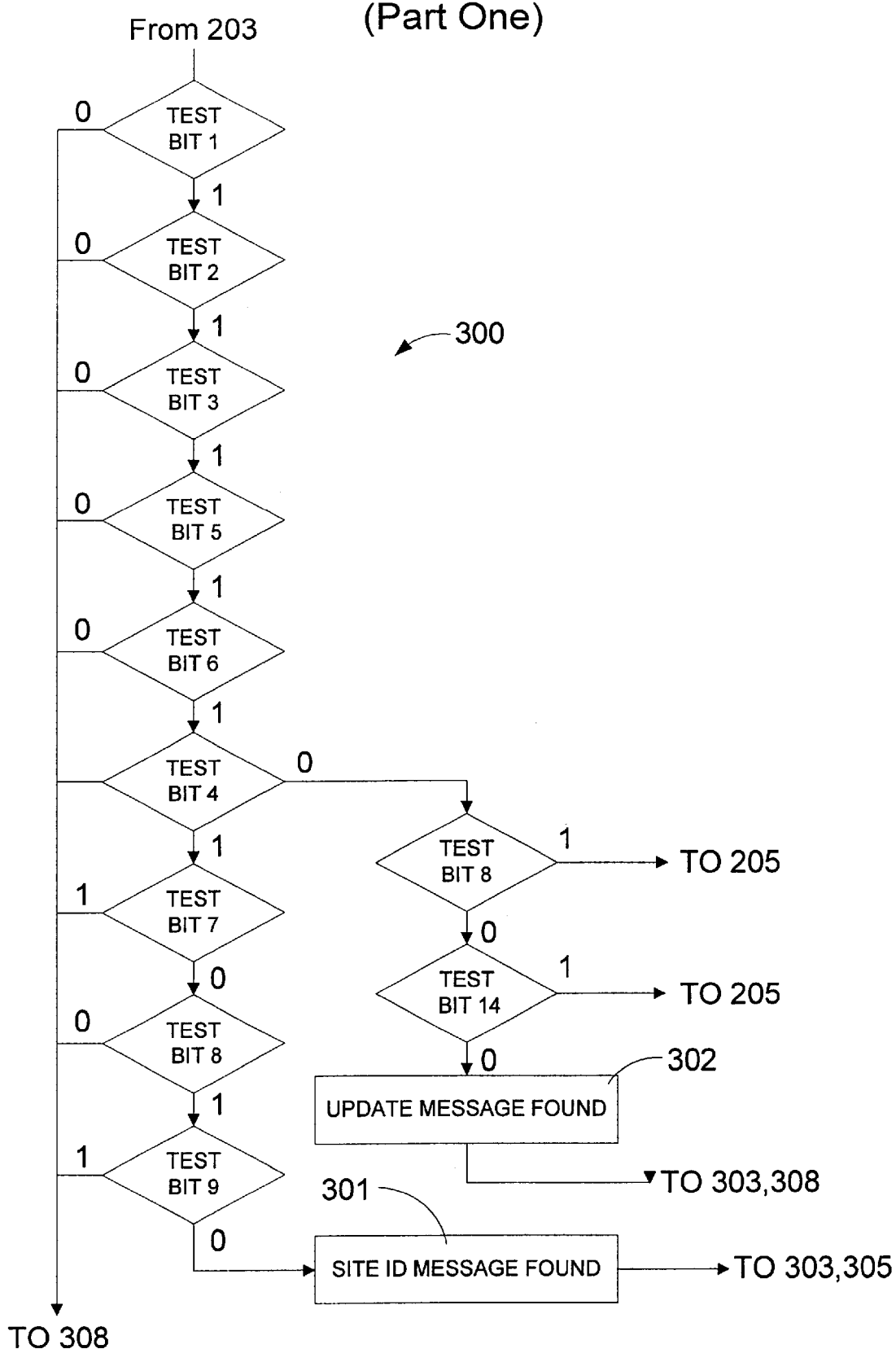
FIG. 10 is a flow chart illustrating tests for discriminating between message types and verifying detection of a message according to another embodiment of the invention.

As shown in FIG. 10, the process 300 does not test each of the leading bits of the forty bit segment in order. Rather, the illustrated testing is simplified based upon the flag bit patterns that are desired to be located. Of course, different sequences of bit testing could be employed. When the pattern of leading bits that designates a potential site identification message are found, that positive result is indicated at 301. Likewise, when the pattern of leading bits that matches the flag bits of an update message are found, that result is indicated at 302. In the illustrated embodiment, in attempting to identify an update message, the bit 14 is tested along with the leading six flag bits of the message. Bit 14 in FIG. 10 corresponds to bit 14 in FIG. 8B. When that bit is zero, a talk group is indicated. When that bit is 1, a unit of no interest in the monitoring of trunked communications is indicated and thus the test is indicated as a failure. If a site identification message is not found, then a determination is made as to whether an update message is found by reverting to 306 of FIG. 9 which corresponds, in this case, to part of FIG. 10. If an update message is not found, the process passes to 205 of FIG. 9.

In this preferred embodiment, as mentioned earlier, when either a potential update message or a potential site identification message is identified from leading bits matching the pattern of flag bits, because of the possibility of false indications, it is desirable to apply a verification test. Most preferably, that test involves the CRC that appears in the last twelve bits of the forty bits of a message. CRC error testing for accuracy of data transmission is well known. However, in the invention, the CRC is not tested to determine whether the transmission of data has been accurate. Rather, the final twelve bits are used as a checkword in a TRC test to determine whether a proper CRC sequence is present that could be used for determining the accuracy of data transmission.

CRC error detection is relatively complex. Basically, upon transmission of digital information, a cyclic redundancy checkword is generated based upon the information that is transmitted. The checkword is appended to the end of the transmitted information, which is subjected to analysis in an interconnected arrangement of storage devices, such as flip-flops and exclusive OR gates. The interconnection of the storage devices and gates establishes a polynomial employed in testing the incoming digital signal. When the same function generator used in that transmission and generation of the checkword is used in checking the accuracy of the received data, the function produced in the function generator at the receiving end will be zero if no transmission errors have occurred.

In the GE/Ericsson system described here, the site identification message and the update message each include twenty-eight bits of information followed by twelve bits that constitute a CRC. The checkword is used in the invention, not to determine the accuracy of the transmission but to confirm that the forty bits identified as a potential message of interest is likely to be such a message. In the flow chart of FIG. 10, at 303, a verification test is applied to a possible message of interest received from 301 or 302. In that test, a register is initialized, i.e., set to zero, at 303a and then a first bit from the forty bit sequence is shifted into the register, at 303b, beginning with the least significant bit. The next bit is selected at 303c and checked at 303d to determine if it is the most significant bit. If not, the bit shifted at 303b is applied, with an exclusive OR function, to the CRC polynomial for the CRC test appropriate for the GE/Ericsson system at 303e. (The polynomial used in the GE/Ericsson system, which may be determined by analyzing transmissions, is $g(x)=x^{12}+x^{10}+x^8+x^5+x^4+x^3+1$, i.e., 1010100111001.) A test is applied at 303f to determine if all bits have been tested. If not, the process from 303b to 303e is repeated. If, at 303d, the most significant bit is found, meaning the end of the potential message has been reached, the CRC test at 303e is not applied. When all bits of the potential message have been processed, the last twelve bits are masked at 303g. Then, the CRC test is applied. If at 304 the CRC test has been passed, the message derived is almost certainly a message of interest. Then the final twelve bits of the forty bit message are discarded. On the other hand, if the CRC test has been failed, the potential site identification message or update message is not actually either of those messages. In that event, the sequence returns to 205 of FIG. 9, the buffer window of forty bits is shifted one bit in the stored information, and the process previously described is repeated.

If the CRC verification has been successfully passed, and at test 311 it is determined that the message is a site identification message, preferably using the prior determination at 301, the process preferably returns to FIG. 9 at 305. Further processing involving that site identification message is described below. If the message is not a site identification message, it has been identified as an update message at 302. Then, a determination is made at 306 as to whether to conduct a further verification test. While the additional verification test might be bypassed, it is preferable to perform the additional verification test shown at 307 of FIG. 10. If it is decided not to apply the additional test, the process returns to the flow of FIG. 9 at 308.

The second verification test 307, referred to here as the alignment test, uses the relationship between messages and their relative positions in the two hundred eighty-eight bit data frames to confirm the existence of a message. For example, a message is sought at a position one hundred sixty-eight bits earlier than the potential update message, eighty-eight bits earlier, eighty bits later, or one hundred twenty bits later, or other positions that include forty bit messages of any type. As indicated at 307a, this process operates by obtaining one such offset from a table of numerous offsets for messages. At 307b, a determination is made as to whether all possible offset table entries have been attempted. If not, at 307c and 307d, it is sequentially determined whether the offset, i.e., number of bits, selected from the table seeks to test bits that are earlier than or later than, i.e., outside the range of, the data stream stored. If so, the test cannot be applied and a new offset is sought at 307f. Likewise, at 307e, it is determined if the offset from the table duplicates what is being tested and, if so, a new offset is selected at 307f. If tests 307c, 307d, and 307e are passed, the CRC test is applied at 307g to the forty bits at the offset position to determine if a message is present there. If not, the process returns to 307f to try a new offset. If the CRC test at 307g is successful, as indicated at test 307h, then verification that a genuine update message has been found is made and the process returns to 308 of FIG. 9. If the table of offsets is exhausted at 307b without passage of the CRC test, then the potential update message is a false message and the process returns at test 307b to FIG. 9 at 205 for selection of a new forty bit buffer window from the stored information in order to seek an additional message of interest.

The site identification message is transmitted only periodically on the control channel and is used in this embodiment of the invention merely to confirm that the control channel is properly tuned. Thus, each site identification message from test 305 of FIG. 10 resets the control channel counter of FIG. 9 at 206. If the control channel counter "times out", then a new control channel is selected, as in the block 115 of FIG. 6 and the test 207 causes the new control channel frequency to be stored. If there is no "time out" of the counter, listening continues on the control channel for the next site identification message.

CRC Testing and Flag Bit Verification

In FIG. 11, the order of the tests used to identify a message and, subsequently, to verify the message are reversed from those illustrated in FIG. 10. Because of the somewhat analogous testing, similar testing steps are identified by the same numbers in FIG. 11 as in FIG. 10, but with the addition of a prime ('). Duplicate description of the tests is not required nor supplied. In FIG. 10, tests constituting the test 204 of FIG. 9 are shown. Initially, the CRC test 303' is applied to the portion of the forty bit window, namely, the final twelve bits, being tested to determined whether a cyclic redundancy checkword is present. If, at 304', no cyclic redundancy checkword is found, i.e., if the test is unsuccessful, then the testing returns to 205 of FIG. 9, advancing the buffer window to the next forty bit segment of the stored information if all of the stored information has not been exhausted in the application of the CRC test.

If the CRC test result at 304' indicates the presence of a cyclic redundancy checkword, identifying a message, then the test 300' for a fixed pattern of bits is applied. This test is the same as test 300, previously applied, used to identify the flag bits in a forty bit message, identifying either an update message or a site identification message. If the test fails with respect to both types of messages, then the process returns to 205 of FIG. 9. If a site identification message is found, then the sequence returns to 305 in FIG. 9. Thereafter, the same process occurs as already described with respect to FIGS. 9 and 10. If an update message is identified at 302', then a determination is made at 306' as to whether to apply a second verification test, i.e., the alignment test 307'. If that alignment test, which is optional, is applied, then, as previously described for test 307, a determination is made as to whether another message is present in the stored information based upon the bit distance to the other message and the presence in the other message of a cyclic redundancy checkword. If such a CRC is present, then further verification is provided that a message has been found. If the second verification is bypassed or successfully passed, the process returns to 308 in FIG. 9. Thereafter, as previously described, a determination is made as to whether a talk group of interest is identified in the message and, if so, the receiver or a dedicated voice channel receiver, if a separate control channel receiver is provided, is tuned to the frequency indicated by the channel assignment code derived from the message.

Alternative Testing and Verification

The testing and verification sequences described for FIGS. 10 and 11 are not exclusive. As described for FIG. 10, the alignment test 307 is optional although the first verification test 303 is highly desirable. With respect to the sequence of FIG. 11, the CRC test is used to identify a message and the test for the fixed pattern of bits is used for verification as well as to distinguish between a site identification message and an update message. Again, the alignment test is optional and provides second verification that is particularly useful in verifying the presence of an update message containing important information.

Figure 12A:
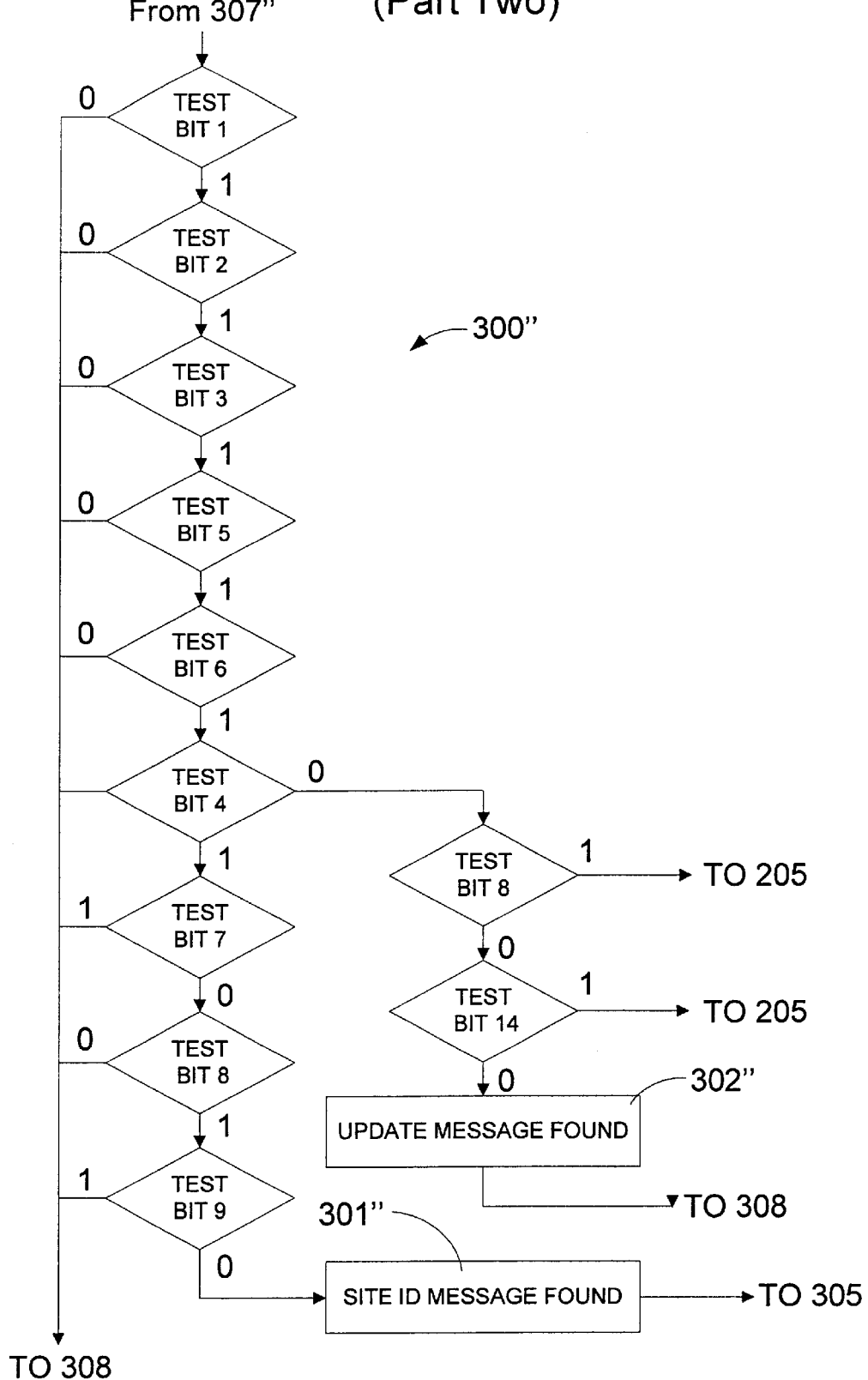
FIGS. 12A and 12B are flow charts illustrating other sequences of testing and verification of messages according to a yet another embodiment of the invention.
Figure 12B:
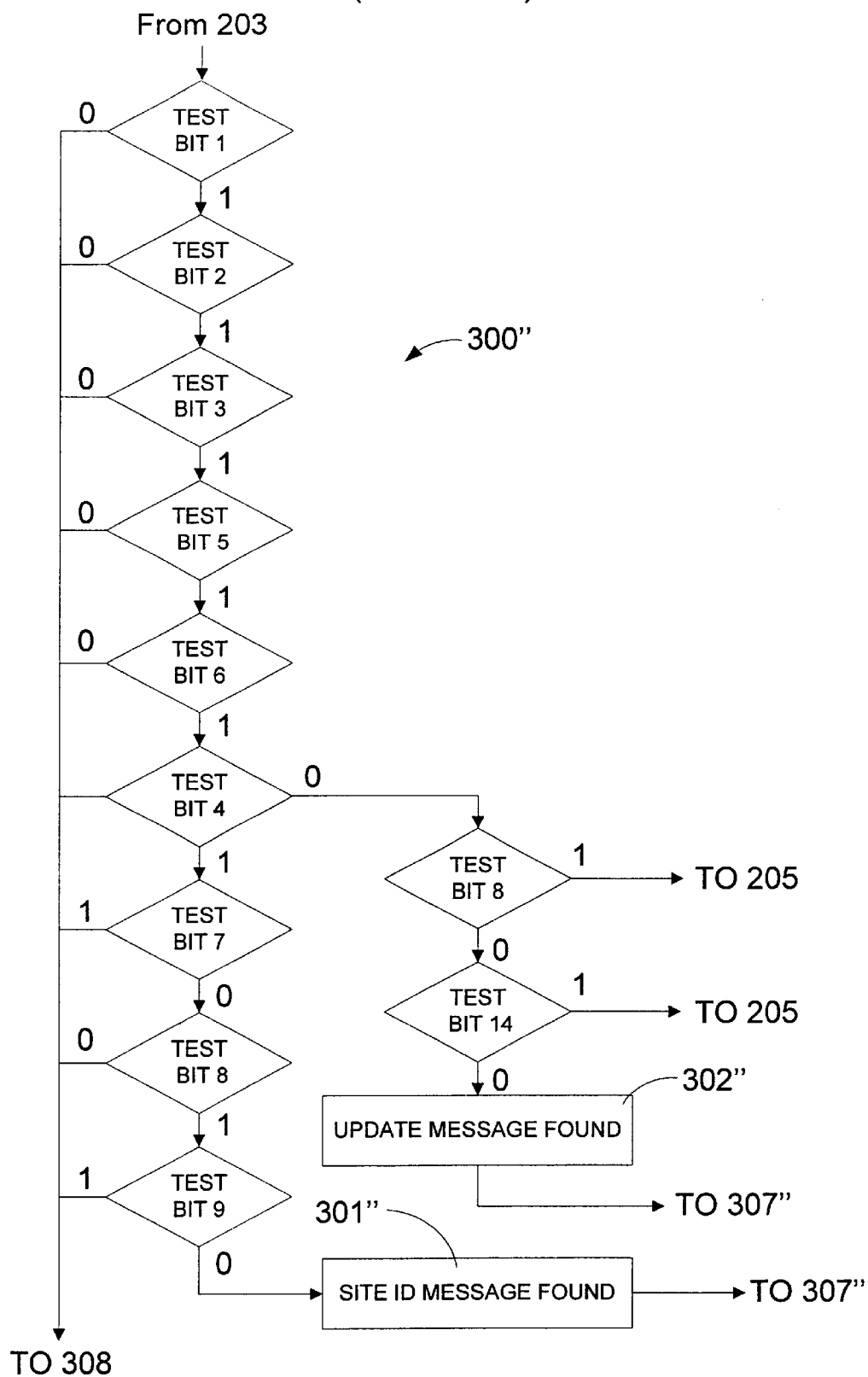

FIGS. 12A and 12B illustrate still different arrangements for testing the stored information to identify a message and verify the message. In these figures, processes previously described are identified with a double prime (") and the description of their respective steps is omitted since it would duplicate description already provided.

In FIG. 12A, the test and verification 204 of FIG. 9 is represented by the CRC test 303", receiving input from 203 of FIG. 9. If the CRC test is not successful at 304", then the process returns to 205 of FIG. 9. If the CRC test is successful, then the alignment test 307" is applied as a verification. If that alignment test, relying upon the presence of a cyclic redundancy checkword in another message offset from an identified message in the stored information by one of several fixed offsets, is unsuccessful, the process also returns to 205 of FIG. 9. If the CRC test is successful at 307h", then further testing is required. The additional testing is required because the CRC test 303" and the alignment test 307" cannot identify the type of message, i.e., a site identification message or an update message. In order to determine whether the message that has been found is a site identification message or an update message, the test 300" for a fixed bit pattern of flag bits is applied.

FIG. 12B illustrates sequential application of the test 300" for a fixed pattern of bits for identifying a message and the message type and the alignment test 307" for verifying a message. Since the type of message is identified in the test 300", no second verification test is required although, optionally, the CRC test 303", not illustrated in FIG. 12B, could be applied for a further verification.

As described, the three tests, fixed pattern, CRC, and alignment, can be applied for either identifying a message or verifying an identified message in almost any sequence. The fixed pattern bit test seeks the described patterns of flag bits uniquely identifying a site identification message and an update message. The cyclic redundancy checkword constitutes another bit pattern, although not necessarily a fixed pattern, that may be used, with the remainder of a message, for identifying a message or verifying a message. Thus, a message can be said to include first and second parts, with the first part having a fixed pattern of bits and the second part having a cyclic redundancy checkword. Both of those parts of a message can be exploited, sequentially, in different aspects of the invention, for identifying and verifying messages that contain, in still other parts, information of value, such as the talk group identification code or channel assignment code. Each of the two messages is forty bits in length and each message is repeated three times in a two hundred eighty-eight bit frame including two such messages and, in a preamble, other information. The preamble may include dotting, the nineteen ones that are exploited in the process described with respect to FIG. 6. Thus, a frame includes numerous patterns in the preamble and the messages that are useful in different processes for identifying a message and verifying a message. It might be considered that since each forty bit message is repeated three times, upon identification of a message, a verification test could be carried out by comparing the message to its immediate forty bit neighbors. While this redundancy test is relatively simple and easily carried out, it has proved, in experience, less practicable than the other tests described because of data transmission errors resulting in some differences between adjacent, mutually inverted messages.

Post Message Identification Processing

The update message supplies important information, namely, the code of the working channel in use and the talk group identification code. When an update message found or verified is at 302, 303, or 307, then processes essentially the same as previously described with regard to blocks 130 and 140 of FIG. 6 are performed. If the talk group extracted from the update message is a talk group of interest, then, based upon the frequency map and the channel identification code derived from the update message, the receiver is tuned to the working channel in use by the talk group of interest. The monitoring continues until the end of transmission data burst, as described with respect to block 140 of FIG. 6, is received. Then, the process reverts to 205, seeking again a talk group of interest by detecting update messages in control channel transmissions.

When the talk group extracted from a message is not a talk group of interest, then the process may optionally return to 205 and shifting of the buffer window by one bit. Alternatively, the knowledge obtained from identifying a message and the relationship, i.e., offsets, to other messages in the stored information may be exploited. In that option, another message is extracted from the stored information, solely by applying the alignment information, i.e., offsets in terms of numbers of bits between messages, and another message is analyzed so that its talk group identification code, if any, is extracted. It is preferable to first test the fixed bit pattern 300 to determine that the offset message is an update message and not a site identification message. (Site identification messages contain no talk group identification code.) The talk group identification code so obtained is tested. If the code is of interest, the receiver is tuned to the indicated working frequency extracted from the indicated working frequency extracted from the message. If the talk group identification code is not of interest, other stored messages may be analyzed in the same way until all messages in the stored information are analyzed or until the receiver is tuned to a working channel. Then, at the conclusion of analysis or monitoring, the process reverts to monitoring control channel transmissions.

At 205 of FIG. 9, when neither a site identification nor an update message has been found, the buffer window is incremented so that subsequent windows of stored information forty bits in length can be tested to determine whether a message is present. When bits are present in the buffer that have not yet been tested, as determined at 208, the process returns to 203. However, if the last forty bits of the stored information have been reached and tested without finding a site identification message or an update message, as determined at 208, then the system purges the information stored in the buffer and loads new information from the control channel as indicated at 209. At the same time, a counter is incremented at 210. The counter is reset every time a message of interest is found. The counter has a threshold value which, if reached, means that a threshold number of blocks of data have been analyzed without identification of any message of interest. In that event, it is concluded that the receiver is not tuned to the proper control channel and the control channel frequency is changed at 211, as in block 115 of FIG. 6, a process that is not again described. The processes of FIGS. 9, 10, 11, 12A, and 12B are summarized in FIG. 13.

As in the process described with respect to FIGS. 6 and 7, if the talk group is not one of interest, then the monitoring of the control channel continues until messages are extracted that pertain to talk groups of interest. The process of identification of the talk groups and switching the receiver to an assigned working channel proceeds rapidly so that little information is lost and communication within a talk group can be monitored even though the frequencies rapidly change between communications.

Generalizing Talk Group Monitoring

As explained with regard to FIG. 8B, the talk group identification code occupies bits 18–28, eleven bits of information. In many instances, transceivers in a trunked communication system are organized hierarchically. For example, the first three bits of the talk group identification code may specify an agency encompassing many talk groups. Examples of such agencies may include police forces, fire departments, and local government agencies. The next four bits of the talk group identification code may specify a particular subset of the agency communication units, referred to as a fleet. For example, with regard to police, the fleets may be patrolling units, tactical units, and special operation units. The final four of the eleven bits of the talk group identification code may specify a still smaller part of the agency communication units, sometimes referred to as a subfleet. A subfleet is properly referred to as a talk group. For example, with respect to patrol units of the police, the subfleet units may reflect particular geographical areas being patrolled. This hierarchical arrangement of subcodes with a talk group identification code is not limited to a division of the eleven bits into groups of three bits, four bits, and four bits, but could have other bit groupings within a string of bits, not limited in length to eleven bits, devoted to the talk group identification code. In any event, any hierarchical arrangement within the talk group identification code permits refinement of monitoring of communications.

In general, a talk group selection would mean specification of the full length code, e.g., all eleven bits, so that only the subfleet would be heard. However, by not discriminating as to some bits, e.g., the final eight bits of an eleven bit talk group identification code, i.e., by requiring a match with only the first three bits of the code for tuning the receiver to a working channel, communications for the entire agency are received. Further, for example, by not discriminating as to the final three bits of an eleven bit talk group designation, e.g., by specifying the first eight bits, only communications within a particular fleet of the agency are monitored. In effect, these discriminations truncate the full length talk group identification code. This variable talk group definition can be incorporated by the user of a receiver according to the invention in the process of FIG. 6 at 135 and at a like place in block 130 in the process of FIG. 9, permitting a person monitoring trunked communications to cast as wide or narrow a listening net as desired. Of course, when many communications are occurring simultaneously at the agency or even the fleet level, since only one communication can be heard at a time, some transmissions within a selected agency or fleet may not be heard. In geographical locations where there are few trunked communications, no talk group identification code may be specified by the user of the receiver, so that all trunked communications are monitored. In other words, step 135 of FIG. 6 is, in this instance, essentially eliminated. In an extreme example of generalization, the talk group identification code can be "truncated" to zero bits, i.e., a null value. Then every talk group is of interest and will be subject to monitoring.

Monitoring with Multiple Receivers

Although the foregoing description refers to changing the frequency monitored by the receiver or, when separate voice and control receivers are employed, changing the frequency of the voice receiver, voice channel "tuning" encompasses frequency "selection". In more complex systems according to the invention and including more than two receivers, "tuning" may be achieved by "selecting" an appropriate receiver. In other words, "tuning" would encompass a selection or switching process of choosing between numerous receivers tuned to particular channels. As used here, the term "tuning" encompasses both conventional frequency changing of a single receiver and selecting one of several fixedly tuned receivers in each of the various processes for monitoring communications in a trunked communication system.

The present system has an advantage over the transceivers that participate in trunked communications by passively monitoring trunked communications. In other words, embodiments of the present invention are able to follow a trunked radio communication from beginning to end without being subject to system commands and without using unnecessary information or circuitry. Unlike the transceivers that are part of the trunked system, receivers according to the invention function without transmission of signals, without hand shaking protocols, confirmations, or other interactive steps. Passive monitoring is based solely on receiving, storing, and analyzing control channel information. By contrast, transceivers actively participating in a trunked communications system, for example, in the GE/Ericsson system, are unable to monitor communications unless they are enabled by the control unit to participate in the communication. In that system, only members of a called talk group are able to monitor a communication designating that talk group. All other received signals are rejected by a participating transceiver.

Summary of Monitoring Methods

In the embodiment of the invention first described, the control channel is monitored for a bit pattern indicating the presence, in subsequently transmitted bits, of two messages. The pattern of bits sought in that embodiment consists of nineteen consecutively transmitted data transitions which may be considered, in one aspect, as binary ones, that is sometimes referred to as dotting. The dotting pattern is part of the preamble of a two hundred eighty-eight bit frame preceding two messages that, together, occupy two hundred forty bits of the frame. Thus, this pattern which is sought is not part of a message but is part of a frame that includes two messages. The detection of the pattern of nineteen ones indicates the presence of two subsequently transmitted messages, at least one of which might be an update message including a talk group identification code and a channel assignment code. According to the first described embodiment, once the dotting pattern is detected, subsequently transmitted information is stored and tested for messages containing talk group identification codes and channel assignment codes.

Alternatively, following one of the later described embodiments, information transmitted on the control channel is directly stored and then tested for a pattern of bits. While those bits are, for example, flag bits or a cyclic redundancy checkword, the pattern of bits searched for in the stored information could be the dotting pattern. Upon finding the dotting pattern, either in real time or from stored information, the format of the frame is established from the pattern, meaning that the fixed location of the beginning of each of the two messages is known because their positions in the frame are known. Then, each message can be tested and the information within a message extracted to determine a talk group identification code and a channel assignment code, if present in the message. With reference to FIG. 6, if the dotting pattern is sought in stored information, block 115 would be omitted.

Once the beginning point of a frame is established in stored digital information received on the control channel, messages can be easily located because their positions within the frame are known. In other words, applying the offsets that are used in the alignment test 307, other messages in stored information can be readily found. Since each frame in the GE/Ericsson system includes two messages, both messages in a frame may be tested for codes. Further, messages in subsequently transmitted information may be easily located and analyzed because of the known positions relative to an established frame. Likewise, if digital information from the control channel is stored in advance of locating a pattern of bits indicating the presence of a message, earlier transmitted messages can also be analyzed for their content simply by applying the known offsets from an identified message to the locations of earlier transmitted messages in the stored information.

As apparent from the foregoing discussion, the pattern of bits in the digital information found by testing is not limited to the dotting pattern. The embodiment of the invention first described, instead of testing for the dotting pattern, may test for flag bits of an update message or a site identification message and, upon identifying the flag bits, information stored for analysis as described with respect to FIG. 6. In that event, the block 103 of FIG. 6 would be replaced, for example, by the test 300 of FIG. 9. Then, the remainder of the process illustrated in FIG. 6 would be carried out. That process of FIG. 6 might be further modified by adding verification tests, such as the CRC test or alignment test, once the pattern of flag bits has been identified. In place of seeking the fixed pattern of flag bits or the dotting pattern, a cyclic redundancy checkword test, such as test 306, might be substituted for the block 103 of FIG. 6. Again, that test might be supplemented with the fixed bit pattern test 300. In any event, as in the first described embodiment, upon detecting a particular pattern of bits, data storage would begin for applying subsequent tests to identify the positions and content of messages subsequently transmitted. Conversely, as in the later described embodiments, if information received on the control channel is initially stored, then messages transmitted in time before an identified message can be easily located because of the fixed relative positions of messages and the information within the messages can be extracted.

As demonstrated by the described embodiments, storage of information received on the control channel before or after the identification of a pattern of bits, e.g., dotting, flag bits, or a CRC, indicating the presence of a message may occur before or after the pattern identification. A "floating" storage in which there is continuous storage of newly received information and discharge of earlier received information in a first in, first out fashion may be employed. In other words, during the process of testing for the pattern of bits, newly received information may be continuously stored while information previously received is discarded. Upon identification of the pattern of bits sought, information in their memory is captured so that it can be analyzed for messages that were received before identification of the bit pattern as well as messages that were subsequently received. Thus, in effect, a quasi-real time analysis and data extraction process can be achieved according to the invention, although no genuine real time analysis is possible because information is transmitted sequentially. Thus, storage is required at a bit-by-bit rate, either of received information or processed information. Of course, application of an offset test, such as the test 307, requires that a data string first be captured in memory so that the desired offset test can be applied for messages either leading or lagging in time an identified message.

The invention provides a simple way to monitor trunked radio communications. Using a receiver, decoding control channel data, and, in response, controlling the tuning of the receiver, the invention passively and reliably monitors a trunked radio communication despite changes in frequency during communications. Such a system has not previously been available.

Although the invention has been described with respect to certain preferred embodiments, modifications and additions within the spirit of the invention will occur to those of skill in the art. Therefore, the scope of the invention is not limited by the foregoing description but is defined solely by the following claims.

What is claimed is:

1. A method of monitoring communications in a trunked communication system in which digital messages incorporating a talk group identification code identifying a talk group, and a channel assignment code identifying a working channel frequency on which a voice communication within the talk group takes place, are transmitted over a control channel and voice communications are transmitted over working channels that may change between communications, the method comprising:

with a frequency tunable receiver, monitoring and storing digital information transmitted on a control channel;

testing portions of the stored information for a pattern of bits identifying a message including a channel assignment code and a talk group identification code, to identify a message;

upon finding a message, extracting from the message the channel assignment code and the talk group identification code;

comparing the talk group identification code extracted from the message to a plurality of talk group identification codes of interest, and, if the talk group identification code extracted from the message is one of the talk group identification codes of interest, tuning the receiver to the working channel corresponding to the channel assignment code extracted from the message; and monitoring voice transmissions on the working channel without participating in the voice communications.

2. The method of claim 1 wherein each message includes a first part having a fixed pattern of bits and a second part including a cyclic redundancy checkword, the method comprising testing the first parts of the portions of the stored information for the fixed pattern of bits and, upon failure to find the fixed pattern of bits, resuming testing of the first parts of portions of the stored information for the fixed patterns of bits to identify a message.

3. The method of claim 2 comprising, upon finding the fixed pattern of bits in the first part of a portion of the stored information, thereby identifying a message, verifying the message by applying a test to identify a cyclic redundancy checkword in the message and, if identification of a cyclic redundancy checkword is unsuccessful, resuming testing of the first part of portions of the stored information for the fixed pattern of bits identifying a message.

4. The method of claim 3 including, upon identifying a cyclic redundancy checkword in the message, further verifying the message by applying an alignment test to the message, determining whether another message exists in the stored information at any of a plurality of fixed bit length offsets from the message including the cyclic redundancy checkword and, if the alignment test is unsuccessful, resuming testing portions of the stored information for the fixed pattern of bits identifying a message.

5. The method of claim 1 wherein each message includes a second part having a cyclic redundancy checkword and a first part including a fixed pattern of bits, the method comprising testing the portions of the stored information by applying a test to identify a cyclic redundancy checkword and, upon failure of identification of a cyclic redundancy checkword, resuming testing of the second parts of portions of the stored information for the cyclic redundancy checkword.

6. The method of claim 5 comprising, upon identifying a cyclic redundancy checkword in a portion of the stored information, thereby identifying a message, verifying the message by testing the first part of the message for the fixed pattern of bits and, upon failure to find the fixed pattern of bits, resuming testing of portions of the stored information by applying the test to identify a cyclic redundancy checkword to identify a message.

7. The method of claim 6 including, upon finding the fixed pattern of bits, further verifying the message by applying an alignment test to the message, determining whether another message exists in the stored information at any of a plurality of fixed bit length offsets from the message having the fixed pattern of bits, and if the alignment test is unsuccessful, resuming testing of portions of the stored information by applying the test to identify a cyclic redundancy checkword to identify a message.

8. The method of claim 1 including, upon finding a message, verifying the message by applying an alignment test to the message, determining whether another message exists in the stored information at any of a plurality of fixed bit length offsets from the message and, if the alignment test is unsuccessful, resuming testing portions of the stored information for the pattern of bits identifying a message.

9. The method of claim 1 including testing portions of the stored information for the pattern of bits identifying a message and, upon a failure to detect a message within a specified time, tuning the receiver to a different control channel.

10. The method of claim 1 wherein the talk group identification codes include subcodes comprising respective talk groups, the subcodes being obtained by truncating the talk group identification code, the method including extracting a subcode from a message, comparing the subcode to a list of subcodes of interest and, if the subcode extracted from the message and used in comparing is a subcode of interest, tuning the receiver to the working channel, and, if the talk group subcode extracted from the message and used in comparing is not a subcode of interest, resuming monitoring, storing, and testing portions of stored information received on the control channel for the pattern of bits identifying a message.

11. The method of claim 1 including, upon comparing the talk group identification code extracted from a message to the plurality of talk group identification codes of interest, if the talk group identification code obtained from the message is not a talk group identification code of interest, resuming monitoring, storing, and testing portions of stored information received on the control channel for the pattern of bits identifying a message.

12. The method of claim 1 including, after tuning the receiver to the working channel, detecting absence of transmissions on the working channel, and, in response, tuning the receiver to the control channel and resuming monitoring, storing, and testing portions of stored information received on the control channel for the fixed patterns of bits identifying a message.

13. The method of claim 1 including detecting on the working channel an end-of-transmission signal indicating ending of voice transmissions on the working channel, and, in response, tuning the receiver to the control channel and resuming monitoring, storing, and testing portions of stored information received on the control channel for the fixed patterns of bits identifying a message.

14. An apparatus for monitoring communications in a trunked communication system in which digital messages incorporating a talk group identification code identifying a talk group, and a channel assignment code identifying a working channel frequency on which a voice communication within the talk group takes place, are transmitted over a control channel and voice communications are transmitted over working channels that may change between communications, the apparatus comprising:
    a receiver tunable in frequency for monitoring digital information transmitted on a control channel and voice communications on a plurality of working channels;
    a demodulator for demodulating the digital information received by the receiver on the control channel and producing demodulated information;
    a first memory storing demodulated information received on the control channel;
    testing means for testing portions of the demodulated information stored in the first memory for a pattern of bits identifying a message including a channel assignment code and a talk group identification code, to identify a message;
    analyzing means for extracting the channel assignment code and the talk group identification code from a message stored in the first memory;
    a second memory storing a plurality of talk group identification codes of interest without participating in the voice communications;
    comparing means for comparing the talk group identification code extracted from the message to the plurality of talk group identification codes of interest stored in the second memory and for generating an indication if the talk group identification code extracted from the message matches one of the plurality of talk group identification codes of interest; and
    tuning means for tuning the receiver to a working channel corresponding to the channel assignment code extracted from the message when the comparing means indicates that the talk group identification code extracted from the message is a talk group identification code of interest.

15. The apparatus of claim 14 wherein each message includes a first part having a fixed pattern of bits and a second part including a cyclic redundancy checkword, wherein the testing means comprises means for testing the first parts of the portions of the information stored in the first memory for the fixed pattern of bits to identify a message.

16. The apparatus of claim 15 wherein the apparatus comprises verification means for applying a test for identifying a cyclic redundancy checkword in a message, to verify the presence of the message in the stored demodulated information.

17. The apparatus of claim 16 including second verification means for applying an alignment test to a message to determine whether another message exists in the information stored in the first memory at any of a plurality of fixed bit length offsets from a message in which a cyclic redundancy checkword has been identified, to identify the message.

18. The apparatus of claim 14 wherein each message includes a first part having a fixed pattern of bits and a second part including a cyclic redundancy checkword, wherein the testing means comprises means for applying a test for identifying a cyclic redundancy checkword in a portion of the demodulated information stored in the first memory, to identify a message.

19. The apparatus of claim 18 wherein the apparatus comprises verification means for testing the first part of the message for the fixed pattern of bits, to verify the message.

20. The apparatus of claim 19 including second verification means for applying an alignment test to a message to determine whether another message exists in the demodulated information stored in the first memory at any of a plurality of fixed bit length offsets from a message to verify the message.

21. The apparatus of claim 14 including verification means for applying an alignment test to a message to determine whether another message exists in the demodulated information stored in the first memory at any of a plurality of fixed bit length offsets from a message to verify the message.

22. The apparatus of claim 14 wherein the talk group identification codes included a hierarchy of at least first and second subcodes, the first subcode pertaining to a first set of talk groups and the second subcode pertaining to a second set of talk groups including some but not all of the talk groups in the first set, the apparatus including second comparing means for comparing one of the first and second subcodes extracted from a message to a plurality of talk group identification subcodes of interest.

23. The apparatus of claim 14 wherein the testing means includes means for detecting absence of a message in the demodulation information stored in the first memory and for indicating the absence, and the tuning means includes means for responding to the indication of the absence by tuning the receiver to a different control channel.

24. The apparatus of claim 14 including means for detecting an end-of-transmission signal transmitted on the working channel while the receiver is tuned to the working channel and for providing an indication of detection of the end-of-transmission signal, and wherein the tuning means includes means for tuning the receiver to the control channel in response to the indication of detection of the end-of-transmission signal.

25. An apparatus for monitoring communications in a trunked communication system in which digital messages incorporating a talk group identification code identifying a talk group, and a channel assignment code identifying a working channel frequency on which a voice communication within the talk group takes place, are transmitted over a control channel and voice communications are transmitted over working channels that may change between communications, the apparatus comprising:

a control channel receiver tunable in frequency for monitoring digital information transmitted on a control channel without participating in the voice communications;

a voice channel receiver tunable in frequency for monitoring voice communications on working channels;

a demodulator for demodulating the digital information received by the control channel receiver on the control channel and producing demodulated information;

a first memory storing demodulated information;

testing means for testing portions of the demodulated information stored in the first memory for a pattern of bits identifying a message including a channel assignment code and a talk group identification code, to identify a message;

analyzing means for extracting the channel assignment code and the talk group identification code from a message stored in the first memory;

a second memory storing talk group identification codes of interest;

comparing means for comparing the talk group identification code extracted from the message to the plurality of talk group identification codes of interest stored in the second memory and for generating an indication if the talk group identification code extracted from the message matches one of the plurality of talk group identification codes of interest; and first tuning means for tuning the voice channel receiver to a working channel corresponding to the channel assignment code extracted from the message when the comparing means indicates that the talk group identification code extracted from the message is a talk group identification code of interest.

26. The apparatus of claim 25 wherein each message includes a first part having a fixed pattern of bits and a second part including a cyclic redundancy checkword, wherein the testing means comprises means for testing the first part of portions of the information stored in the first memory for the fixed pattern of bits to identify a message.

27. The apparatus of claim 26 wherein the apparatus comprises verification means for applying a test for identifying a cyclic redundancy checkword in a message, to verify the presence of the message in the stored demodulated information.

28. The apparatus of claim 27 including second verification means for applying an alignment test to a message to determine whether another message exists in the information stored in the first memory at any of a plurality of fixed bit length offsets from a message in which a cyclic redundancy checkword has been identified, to identify a message.

29. The apparatus of claim 25 wherein each message includes a first part having a fixed pattern of bits and a second part including a cyclic redundancy checkword, wherein the testing means comprises means for applying a test for identifying a cyclic redundancy checkword in a portion of the demodulated information stored in the first memory, to identify a message.

30. The apparatus of claim 29 wherein the apparatus comprises verification means for testing the first part of the message for the fixed pattern of bits to verify the message.

31. The apparatus of claim 30 including second verification means for applying an alignment test to a message to determine whether another message exists in the demodulated information stored in the first memory at any of a plurality of fixed bit length offsets from a message having the fixed pattern of bits to verify the message.

32. The apparatus of claim 25 including verification means for applying an alignment test to a message to determine whether another message exists in the demodulated information stored in the first memory at any of a plurality of fixed bit length offsets from a message to verify the message.

33. The apparatus of claim 25 wherein the talk group identification codes include a hierarchy of at least first and second subcodes, the first subcode pertaining to a first set of talk groups and the second subcode pertaining to a second set of talk groups including some but not all of the talk groups in the first set, the apparatus including second comparing means for comparing one of the first and second subcodes extracted from a message to a plurality of talk group identification subcodes of interest.

34. The apparatus of claim 25 wherein the testing means includes means for detecting absence of a message in the demodulated information stored in the first memory and for indicating the absence, and including second tuning means for responding to the indication of the absence by tuning the control channel receiver to a different control channel.

35. In a trunked communication system in which digital messages incorporating a talk group identification code identifying a talk group, and a channel assignment code identifying a working channel frequency on which a voice communication within the talk group takes place, are transmitted over a control channel and voice communications are transmitted over working channels that may change between communications, a method of producing a frequency map of channel assignment codes and working channel frequencies comprising:

monitoring a working channel frequency until a message including a talk group identification code is received on the working channel;

extracting a talk group identification code from the message received on the working channel;

upon extracting the talk group identification code, monitoring the control channel for messages and extracting the talk group identification code and channel number of the working channel from each message received on the control channel; and comparing the talk group identification code from the message received on the working channel with the talk group identification code of a message received on the control channel and, when the talk group identification codes match, entering the working channel frequency and corresponding channel number in a frequency map.

36. The method of claim 35 including, after entering the working channel frequency and corresponding channel in the frequency map, monitoring another working channel frequency and repeating the preceding processes until all working channel frequencies and corresponding channel assignment codes have been entered in the frequency map.

37. A method of monitoring communications in a trunked communication system in which digital messages incorporating a talk group identification code identifying a talk group, and a channel assignment code identifying a working channel frequency on which a voice communication within the talk group takes place, are transmitted over a control channel and voice communications are transmitted over working channels that may change between communications, the method comprising:

with a frequency tunable receiver, monitoring digital information transmitted on a control channel;

testing the digital information for a pattern of bits indicating presence of a message within the digital information;

upon identifying the presence of a message, locating the message, and, if present in the message, extracting from the message a channel assignment code and a talk group identification code;

comparing the talk group identification code extracted from the message to a plurality of talk group identification codes of interest and, if the talk group identification code extracted from the message is one of the plurality of talk group identification codes of interest, tuning the receiver to the working channel corresponding to the channel assignment code extracted from the message; and monitoring voice transmissions on the working channel without participation in the voice communications.

38. The method of claim 37 including testing for a dotting pattern in the digital information transmitted on the control channel to determine whether a message is present within the digital information.

39. The method of claim 37 including testing for a fixed pattern of flag bits that is part of a message transmitted on the control channel to determine whether a message is present within the digital information.

40. The method of claim 37 including testing for presence of a cyclic redundancy checkword that is part of a message transmitted on the control channel to determine whether a message is present within the digital information.

41. The method of claim 37 including testing for a fixed sequence of bits transmitted on the control channel at intervals to determine whether a message is present within the digital information.

* * * * *